(12) United States Patent
Wu et al.

(10) Patent No.: US 11,516,201 B2
(45) Date of Patent: Nov. 29, 2022

(54) ENCRYPTION AND DECRYPTION TECHNIQUES USING SHUFFLE FUNCTION

(71) Applicant: Jonetix Corporation, Cupertino, CA (US)

(72) Inventors: Paul Ying-Fung Wu, Saratoga, CA (US); Richard J. Nathan, Gilroy, CA (US); Harry Leslie Tredennick, Los Gatos, CA (US)

(73) Assignee: Jonetix Corporation, Cupertino, CA (US)

( * ) Notice: Subject to any disclaimer, the term of this patent is extended or adjusted under 35 U.S.C. 154(b) by 74 days.

(21) Appl. No.: 17/154,880

(22) Filed: Jan. 21, 2021

(65) Prior Publication Data

US 2021/0320910 A1    Oct. 14, 2021

Related U.S. Application Data

(63) Continuation of application No. 16/533,024, filed on Aug. 6, 2019, now Pat. No. 10,931,658, which is a
(Continued)

(51) Int. Cl.
*H04L 9/40* (2022.01)
*H04L 9/32* (2006.01)
(Continued)

(52) U.S. Cl.
CPC ........ *H04L 63/0807* (2013.01); *H04L 9/0861* (2013.01); *H04L 9/14* (2013.01);
(Continued)

(58) Field of Classification Search
CPC ....... H04L 9/0861; H04L 9/14; H04L 9/3213; H04L 9/3226; H04L 9/3242;
(Continued)

(56) References Cited

U.S. PATENT DOCUMENTS

| 5,872,517 A | 2/1999 | Hellman |
| 8,627,084 B1 | 1/2014 | Pauker et al. |

(Continued)

OTHER PUBLICATIONS

Yahya et al., An AES-Based Encryption Algorithm with Shuffling, 2009, Department of Computer Science, Al-Zaytoonah University, pp. 1-2 (Year: 2009).*

(Continued)

*Primary Examiner* — Ashokkumar B Patel
*Assistant Examiner* — William B Jones
(74) *Attorney, Agent, or Firm* — Marc P. Schuyler

(57) ABSTRACT

Encryption and decryption techniques based on one or more transposition vectors. A secret key is used to generate vectors that describe permutation (or repositioning) of characters within a segment length equal to a length of the transposition vector. The transposition vector is then inherited by the encryption process, which shifts characters and encrypts those characters using a variety of encryption processes, all completely reversible. In one embodiment, one or more auxiliary keys, transmitted as clear text header values, are used as initial values to vary the transposition vectors generated from the secret key, e.g., from encryption-to-encryption. Any number of rounds of encryption can be applied, each having associated headers used to "detokenize" encryption data and perform rounds to decryption to recover the original data (or parent token information). Format preserving encryption (FPE) techniques are also provided with application to, e.g., payment processing.

22 Claims, 13 Drawing Sheets

Related U.S. Application Data continuation of application No. 16/004,181, filed on Jun. 8, 2018, now Pat. No. 10,419,416, which is a continuation of application No. 15/464,384, filed on Mar. 16, 2017, now Pat. No. 10,021,085, which is a continuation of application No. 14/831,070, filed on Aug. 20, 2015, now Pat. No. 9,635,011.

(60) Provisional application No. 62/099,446, filed on Jan. 3, 2015, provisional application No. 62/089,104, filed on Dec. 8, 2014, provisional application No. 62/042,335, filed on Aug. 27, 2014.

(51) Int. Cl.
*H04L 9/08* (2006.01)
*H04L 9/14* (2006.01)

(52) U.S. Cl.
CPC .......... *H04L 9/3213* (2013.01); *H04L 9/3226* (2013.01); *H04L 9/3242* (2013.01); *H04L 9/3297* (2013.01); *H04L 63/0428* (2013.01); *H04L 63/083* (2013.01); *H04L 2209/08* (2013.01); *H04L 2209/34* (2013.01)

(58) Field of Classification Search
CPC ............... H04L 9/3297; H04L 2209/08; H04L 2209/34; H04L 63/0807; H04L 63/0428; H04L 63/083
See application file for complete search history.

(56) References Cited

U.S. PATENT DOCUMENTS

| | | | |
|---|---|---|---|
| 9,208,491 B2 | 12/2015 | Spies et al. | |
| 9,489,521 B2 | 11/2016 | Martin et al. | |
| 9,635,011 B1 | 4/2017 | Wu | |
| 10,021,085 B1 | 7/2018 | Wu et al. | |
| 10,263,779 B2 | 4/2019 | Wu et al. | |
| 10,419,416 B2 | 9/2019 | Wu et al. | |
| 2002/0123972 A1 | 9/2002 | Hodgson et al. | |
| 2005/0147244 A1 | 7/2005 | Molovyan et al. | |
| 2006/0034456 A1 | 2/2006 | McGough | |
| 2011/0131635 A1 | 6/2011 | Schneider | |
| 2012/0288085 A1* | 11/2012 | Li | H04L 9/0631 380/28 |
| 2013/0103685 A1 | 4/2013 | Preneel et al. | |
| 2013/0251150 A1 | 9/2013 | Chassagne | |
| 2014/0192809 A1 | 7/2014 | Park | |
| 2014/0304825 A1 | 10/2014 | Gianniotis et al. | |
| 2014/0344164 A1 | 11/2014 | Pauker et al. | |
| 2015/0178146 A1* | 6/2015 | Adikari | G06F 11/10 714/48 |
| 2015/0222423 A1* | 8/2015 | Pepin | H04L 9/0631 713/189 |

OTHER PUBLICATIONS

Yahya et al., "A Shuffle Image-Encryption Algorithm," Journal of Computer Science 4 (12): 999-1002, 2008 ISSN 1549-3636, 2008 Science Publications, 4 pages.

"Streamlining Information Protection Through a Data-centric Security Approach," Hewlett-Packard Company White Paper, www.voltage.com, 2015 Hewlett-Packard Development Company, L.P., 16 pages.

Notice of Allowance, U.S. Appl. No. 15/461,384, dated Apr. 10, 2018, 20 pages.

Notice of Allowance and interview summary, U.S. Appl. No. 14/831,070, dated Mar. 15, 2017, 23 pages.

Notice of Allowance U.S. Appl. No. 16/004,181, dated May 13, 2019, 17 pages.

* cited by examiner

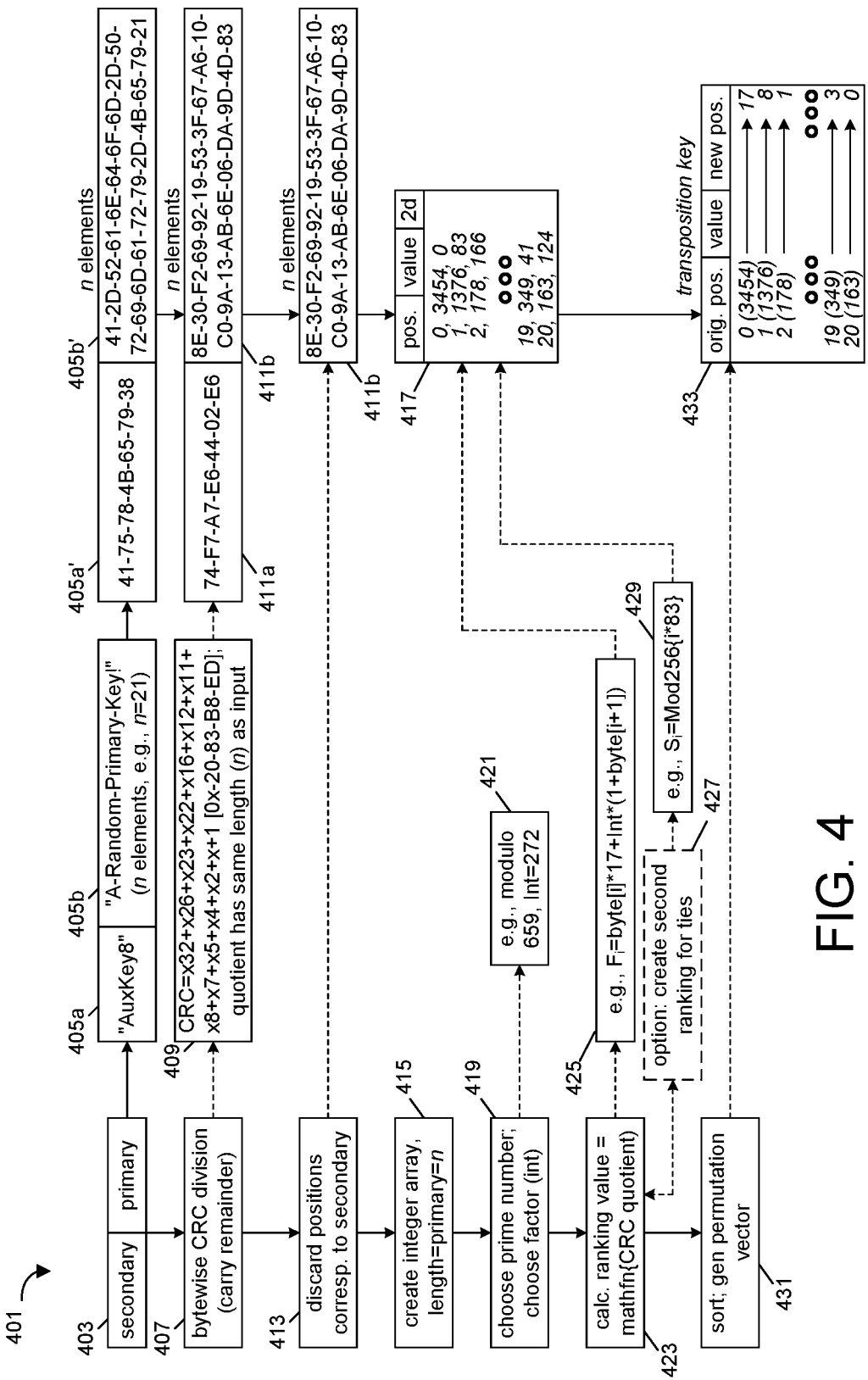

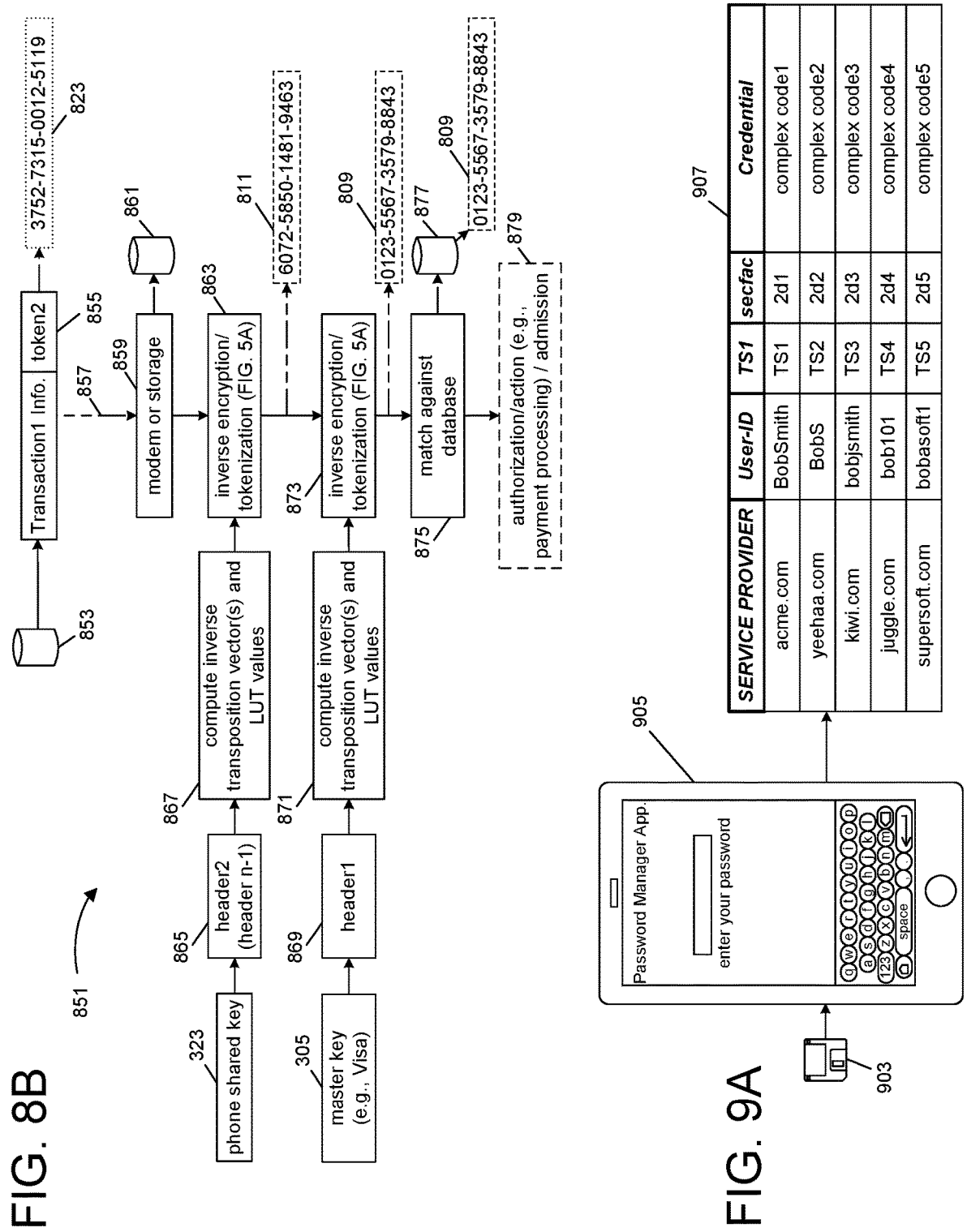

ENCRYPTION AND DECRYPTION TECHNIQUES USING SHUFFLE FUNCTION

REFERENCE TO RELATED APPLICATIONS

This patent application is a continuation of U.S. Utility patent application Ser. No. 16/533,024, filed on Aug. 6, 2019 on behalf of first-named inventor Paul Ying-Fung Wu for "Encryption And Decryption Techniques Using Shuffle Function." In turn, U.S. Utility patent application Ser. No. 16/533,024 claims priority to U.S. Utility patent application Ser. No. 16/004,181 (filed Jun. 8, 2018, and issued on Sep. 17, 2019 as U.S. patent Ser. No. 10/419,416), which in turn claims priority to U.S. Utility patent application Ser. No. 15/461,384 (filed Mar. 16, 2017, and issued on Jul. 10, 2018 as U.S. patent Ser. No. 10/021,085), which in turn claims priority to U.S. Utility patent application Ser. No. 15/461,384 claims priority to U.S. Utility patent application Ser. No. 14/831,070 (filed Aug. 20, 2015, and issued on Apr. 25, 2017 as U.S. Pat. No. 9,635,011), which in turn claims priority to the following patent applications: U.S. Provisional Patent Application No. 62/042,335, filed on Aug. 27, 2014 on behalf of first-named inventor Paul Ying-Fung Wu for "Encryption and Decryption Techniques Using Shuffle-Mask Function;" U.S. Provisional Patent Application No. 62/089,104, filed on Dec. 8, 2014 on behalf of first-named inventor Paul Ying-Fung Wu for "Improved Secure POS System & Banking Transactions, Related Methods, Devices & Systems;" and U.S. Provisional Patent Application No. 62/099,446, filed on Jan. 3, 2015 on behalf of first-named inventor Paul Ying-Fung Wu for "Improved Secure POS System & Banking Transactions, Related Methods, Devices & Systems." Each of the aforementioned utility and provisional patent applications is hereby incorporated by reference.

BACKGROUND

The regular practice of storing proprietary or secret information in the memory of digital devices and transmitting that information over unsecure channels has created significant information security issues. While the information and associated systems can be password protected, and while encryption techniques exist to ostensibly render that information unusable to a hacker or thief, such techniques can unfortunately be computationally intensive or time consuming, or require a user to memorize complex passwords in order to render security sufficiently robust. Also, even with a well-chosen password, it is becoming increasingly easy to break conventional encryption methodologies. While it is possible to make encryption more complex, e.g., using very long keys for example (e.g., 256 bit keys, or longer), this makes the encryption even more computationally expensive; such techniques are also still subject to a number of attacks, such as key logging.

A need exists for improved methods, devices and systems to assist with the protection of electronic information and access to electronic systems.

BRIEF DESCRIPTION OF THE DRAWINGS

FIG. 4 is a flow diagram that illustrates one embodiment for deriving a transposition vector from a secret key and one or more auxiliary keys.

FIG. 8B is an illustrative diagram used to explain decryption of a token (e.g., generated using the structure depicted by FIG. 8A), and associated application to credentials authentication (e.g., payment processing).

FIG. 9A is an illustrative diagram associated with a password manager application that employs techniques described herein.

Figure 1A:
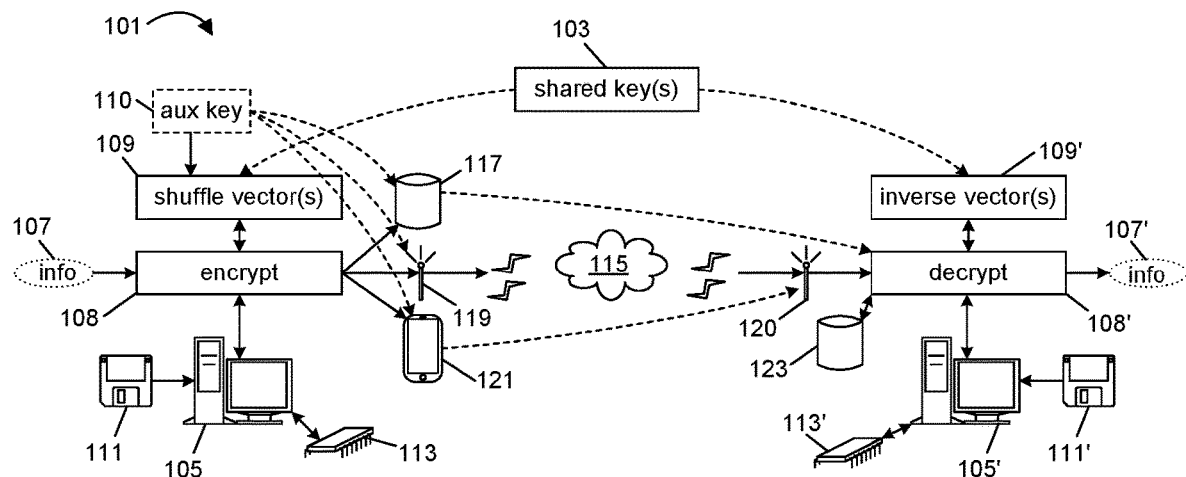
FIG. 1A is an illustrative diagram of a system that encrypts and decrypts information using at least one transposition (or "shuffle") vector, derived from a secret key.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to encrypt (or decrypt) data using transposition vectors. The various techniques can be embodied as software for performing these techniques, in the form of a computer, service, cloud service, system or other device or apparatus, in the form of data encrypted as a result of these techniques, or in another manner. While specific examples are presented, the principles described herein may also be applied to other methods, devices and systems as well.

DETAILED DESCRIPTION

This disclosure provides techniques for encryption and decryption, as well as products, methods, systems and software which embody or which result from such techniques. More specifically, this disclosure provides encryption and decryption techniques which are based on the use of a shuffle-vector (or transposition-vector), derived from one or more shared (secret) keys. To provide one extremely simple example used to introduce character transposition, the ASCII text "have a nice day" can have its various characters shuffled to "aayvdechdi en;" this disclosure similarly provides techniques for deriving transposition vectors used to shuffle characters (or related data). More specifically, these transposition vectors can be derived from secret keys and optionally also from randomizing information that makes each encryption (from a common secret key or set of secret keys) different. The techniques disclosed herein can be applied at any level of granularity within a set of data, for example, to shuffle bytes, as just exemplified above, or on a bit-wise basis or on the basis of any set or grouping of one or more bits. For example, among the various embodiments discussed below, one embodiment shuffles individual bits of a string to be encrypted or decrypted irrespective of byte boundaries; another embodiment derives multiple shuffle (i.e., transposition) vectors (e.g., from respective keys) and, for each byte of each string, differently shuffles a fixed or variable subset of bits that make up the byte according to a respective one of the multiple vectors; the first two bits of each byte in such an embodiment for example could be sorted to a different byte position according to one vector, the second two bits according to a different vector, the third two bits according to yet another vector, and the last two bits according to yet another vector—the shuffled bits are reassembled into bytes which then can be further shuffled (e.g., on a byte-wise basis) as desired. Such a scheme can be applied to an entire input character string, or can be varied from segment-to-segment, for example, in manner dependent on yet another transposition vector. As should be apparent, these techniques provide powerful tools for permuting input strings in a very complex manner. These relatively simple examples are illustrative of the fact that the techniques disclosed herein have many transpositions and variations that will be evident to those skilled in the art.

Thus, one embodiment disclosed herein provides for an encryption methodology and a decryption methodology; an input string is received, and under the control of a processor or digital processing circuitry, it is subject to the encryption process (i.e., including the derivation and use of at least one transposition vector) and an output encryption string is created. This output encryption string can then be stored or transmitted and is safe from decryption or use by hackers. The encrypted information later can be subjected to the decryption process (including the derivation and use of at least one reciprocal transposition vector as further described herein), again, under the control of a processor or digital processing circuitry and an output decryption string is created. This output decryption string matches the original input string.

In another embodiment, these techniques are applied to provide a technique for format-preserving encryption (FPE). For example, there exist many systems that require that information fit within or match certain field parameters, such as a numerical-only format and a specific length; two examples of this are systems for processing credit card numbers and identity/social security numbers. Techniques provided below can be applied to encrypt information in a manner where the encrypted information has the same format as the original information, e.g., as a sixteen-digit (i.e., base-10) number. The encrypted information can be decrypted, once again, using one or more shared transposition keys; these keys, and the associated use of character shuffling, permit the original number to be derived from the encrypted data. Note that as used herein, a "character" generally is used to refer to any quantum of information, whether in the form of an individual bit, collection of contiguous bits (e.g., a byte), or a collection of noncontiguous bits (e.g., the least and most significant bit only of a byte); many examples are possible.

Still another specific embodiment presented below applies these techniques to specific applications and systems; for example, another specifically contemplated-implementation provides for a password manager, embodied as a software application on a digital device, where that software application manages numerous identities including credit card numbers, account passwords, identity/social security numbers, and other information (whether such requires a preserved format for communication or encryption or not).

Numerous other variations and applications will occur to those having skill in the art based on the innovative techniques described below.

Note that in addition to permuting the order of characters in string, other forms of processing are optionally applied to contribute to the security provided by the innovative techniques described below. Several specific techniques will be further described below. Prior to discussing such techniques, however, one basic encryption process will be provided as an introductory example.

A first user desires to store information for later retrieval where that information will be secure against hacking and/or interception. The first user therefore receives (or generates) a secret key that can, for example, be arbitrary, long and complex. This key is a primary key and will be reused in multiple different encryption processes. The primary key is not itself shared; in a data encryption application (e.g., only on the user's digital device), it can be known only to the user, and in other applications (e.g., the FPE application discussed below), it is known by both the user and one generating the primary key and providing its use for purposes of the encryption (e.g., a service provider, credit card company, government agency, credit bureau, etc.). The first user also receives (or generates) an auxiliary key which serves to randomize the application of the primary key; for example, the auxiliary key can be a time stamp, or a monotonically increasing number (or indeed, any other type of information). The auxiliary key and the primary key are combined, and subjected to a mathematical process that both scrambles the combined information and also generates an avalanche effect, at least relative to the auxiliary key information, such that minor differences in the combined information (e.g., a one bit difference in the auxiliary) creates widespread differences in the scrambled information (e.g., many bits of the combined information are changed dependent on the one bit difference in the auxiliary key). This scrambled information is then subjected to a mathematical process that involves some form of multiplication and finite space math, for example, multiplying each character of the scrambled information and then taking the modulo of that multiplication, character-by-character. The resulting remainders (e.g., byte-wise values) are then sorted according to a selected sort-order (e.g., numerically increasing); this sort order is used to generate the shuffle or transposition vector. Note that because of the nature of the key(s), the bit diffusion processes, the mathematical operation and the finite space mathematics, that the transposition vector will be difficult to predict by one not having all of the keys. The permutation effected according to this vector is then applied to (i.e., inherited by) an encryption process in which it is used to encrypt input text and/or a decryption process to decrypt input text according to the sort order just described. Reflecting on this operation, it is noted that the secret key is used to generate the transposition vector; this key is then not directly used to encrypt/decrypt an input string, but rather, the transposition vector is inherited by the encryption/decryption process, and that encryption/decryption of the input string is based on this transposition vector. As should be apparent to those skilled in the art, this design affords a number of processes where the secret key can be kept secure (e.g., stored in a secure container or secure memory of a portable device, such as a mobile phone) and where the auxiliary key and the input string are applied to yield encryption that optionally changes from operation to operation; it is not required that the primary key be used outside of the user's digital device (e.g., or a secure container of that device). If desired, the auxiliary key and the encrypted string can also then be transmitted in the clear (e.g., to a recipient), and can be selectively decrypted by one having the secret key. Also if desired, the encrypted information can be further encrypted a second time (e.g., doubly-encrypted using a different, second secret key and selected auxiliary key), a third time, etc., and the encrypted information can then only be decrypted by an entity possessing each of the primary keys, the auxiliary keys used for each round, and the proper order and manner of application of each of these keys. It is noted again that this example is provided for introductory purposes and that significantly more elaborate encryption/decryption techniques are provided below. As an example, one embodiment discussed below also uses the primary key just discussed (e.g., and an auxiliary key, in one embodiment, a time stamp) to generate a non-linear substitution table, which is applied as one element of the overall encryption (or decryption) process to each segment of a string to be encrypted (or decrypted). Yet another embodiment converts a non-binary number space to multiple number spaces and provides different processing of each, which facilitates very fast hardware processing of the binary number space (e.g., using simple shifts, adds, XORs, bit inversions, and similar hardware logic operations). Further detail on these embodiments will be discussed below.

As just noted, one advantage presented by many embodiments is speed of operation. That is, encryption/decryption is advantageously implemented by digital hardware logic that performs simple shifts, additions and other hardware operations on an input string, without relying significantly on complex mathematical operations performed primarily in software. This processing provides for encryption/decryption processing that is both fast and reliable. Also, while many of the examples provided below use relatively short keys, i.e., these examples are provided for ease of explanation, it should be understood that the techniques provided herein are amenable to the use of very long keys, i.e., having 4,000 bit, 2,000 byte or greater complexity. Thus, the described processes can use significantly longer keys than are used in many conventional encryption processes, in large part because the keys (e.g., the primary key) are not directly used in the encryption/decryption of an input string, but rather are used to create one or more transposition vectors.

In yet another embodiment, the techniques discussed above can be used not only by a password manager to securely exchange a password with a recipient, but also to generate a complex password, in some embodiments, in a manner transparent to a user. For example, in one specifically contemplated version of the password manager introduced above, the primary key is applied to convert a relatively simply password (e.g., "have a nice day") using the encryption techniques introduced above (with padding optionally applied to such a password). A bit diffusion process (e.g., CRC division or other hashing process applied on a progressive character-basis) is then applied to completely scramble the values of this space, with one or more transposition vectors being applied to generate a much more complex, longer password (a "complex code"). The password manager then uses this complex code as the password, which can then optionally be doubly-encrypted during communication, etc. In such an example, the user's original password is not stored on the user's device, and is optionally used by the password manager only for password recovery.

Additional applications and embodiments, and further advantages of these various applications and embodiments, will be apparent to those skilled in the art following the discussion below.

Note that specifically contemplated implementations can include an apparatus comprising instructions stored on non-transitory machine-readable media. Such instructional logic can be written or designed in a manner that has certain structure (architectural features) such that, when the instructions are ultimately executed, they cause the one or more general purpose machines (e.g., a processor, computer or other machine) to behave as a special purpose machine, having structure that necessarily performs described tasks on input operands in dependence on the instructions to take specific actions or otherwise produce specific outputs. Such instructions can optionally be embodied on a digital device that includes such a machine (e.g., one or more processors); by way of non-limiting example, the techniques described herein can be embodied in the form of a software application downloadable to and installable for execution on a smart phone, digital pad, computer or other digital device, or alternatively, can be bundled with (i.e., sold as part of) such a device. "Non-transitory machine-readable media" (or "non-transitory computer-readable media") as used herein means any tangible (i.e., physical) storage medium, irrespective of how data on that medium is stored, including without limitation, random access memory, hard disk memory, optical memory, a floppy disk or CD, solid state drive, fuse-based storage, server storage, volatile and non-volatile memory and other tangible mechanisms where instructions may subsequently be retrieved by a machine. The machine-readable media can be in standalone form (e.g., a program disk or solid state device) or embodied as part of a larger mechanism, for example, a laptop computer, portable device, server, network, printer, or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or different processors or processor cores, depending on embodiment. Such instructions can also take the form of microcontroller-style instructions, which for example, operate special purpose hardware to perform a very limited series of operations. Throughout this disclosure, various processes will be described, any of which can generally be implemented as instructions stored on non-transitory machine-readable media, and any of which can be used for an encryption, decryption or similar process. Also depending on implementation, the instructions can be executed by a single computer and, in other cases, can be stored and/or executed on a distributed basis, e.g., using one or more servers, web clients, or application-specific devices. Each function mentioned in reference to the various FIGS. herein can be implemented as part of a combined program or as a standalone module, either stored together on a single media expression (e.g., single floppy disk) or on multiple, separate storage devices. The same is also true for any encryption data generated according to the processes described herein, i.e., such information can be stored on non-transitory machine-readable media for temporary or permanent use, either on the same machine or for use on one or more other machines; for example, data can be encrypted using a first machine, and then stored for transfer, e.g., for download via the internet (or another network) or for manual transport (e.g., via a transport media such as a DVD) for use on another machine.

FIG. 1A provides a first example of how such a system can be embodied. The system is generally referenced using numeral 101. In such a system, it is desired to permit a user to encrypt (108) some form of information 107 which will then be stored (117) or transmitted (119/121), and to permit a user to later decrypt (108') the encrypted information to recover the original information (107'). The users can be the same individual (for example, encrypting and securely storing the information exclusively on a first digital device, 105, or between multiple digital devices of the same user) or they can be respective users where the information is to be transmitted in encrypted form to a second digital device (105') for decryption by the second user. As with the examples presented earlier, a shared key 103 is used as the basis for both encryption and decryption of the information. In many of the examples discussed herein, the first user can be an individual while the second user can be a business or other enterprise, e.g., the shared key is optionally unique to the first user, and the second user is optionally a credentials-issuing authority (for example, a security service of some type, the government, a web business, a credit card company, etc.). This is not required for all embodiments. To provide an illustrative example that will be further used for certain embodiments to be described further below, the shared key can be generated by a credit card company and provided to each credit card holder to generate tokens (i.e., format preserving encryptions derived from the first user's credit card number) which then look like credit card numbers. To confirm payment transactions, the credit card company ultimately receives clear text transmissions (e.g., of transaction information, user identity and so forth) and uses this information to decrypt a token provided as part of a transaction, and thereby regenerate or authenticate an original credit card number associated with the individual; if information matches (and optionally, if other requirements are also met), the card is deemed authentic and the transaction is approved.

The first user takes the information (107) to be encrypted and uses the shared key (103) and, optionally, auxiliary key information (110), to generate one or more transposition or shuffle vectors (109). As before, the auxiliary key in one embodiment permits the encryption for each process to be different, in effect randomizing the application of the primary key to generate the shuffle vectors (109); in some examples, a simple time stamp can be used. In a different embodiment that relies upon the use of an auxiliary key 110, the auxiliary key can simply be used as an authentication factor, e.g., the user enters a password, or specifies the location of a file that is used as a secondary key, or software identifies an expected attribute of the digital device 105 (e.g., such as the presence of a specific hardware key, attribute, hash value, which is then interrogated/verified), or in some other manner. In this regarding the key information (i.e., the shared key 103 and/or any auxiliary key 110) is said to provide a transposition key (a key used to derive the transposition vectors), and the transposition vectors in turn describe reordering of bits of the input information in a specific length segment to occupy different positions within that segment. The first device 105 takes each shuffle vector (109) and uses this to encrypt information 107 using optional additional processes, as previously introduced. As also noted earlier, the first machine preferably performs or sequences at least some of the encryption tasks under the control of encryption software (denoted by non-transitory machine-readable media icon 111) and preferably also uses a hardware intensive process that relies heavily on shift and add operations in order to perform the encryption processes applied to an input string; this hardware intensive process is conceptually represented by circuitry icon 113. Generally speaking, while software 111 is used to orchestrate the operations (e.g., and process the primary key and auxiliary key(s)), the hardware intensive process is typically used to process an input string, and is driven by one or more application specific circuits, designed so as to perform the described processes in a very fast manner (again, using shifts, additions, and other very fast hardware logic operations). Note that irrespective of whether application-specific hardware is used, and irrespective of the degree that software is used to control and/or perform such operations, the hardware circuit elements acting alone or under the control of such software can be referred to as "circuitry."

Figure 1B:
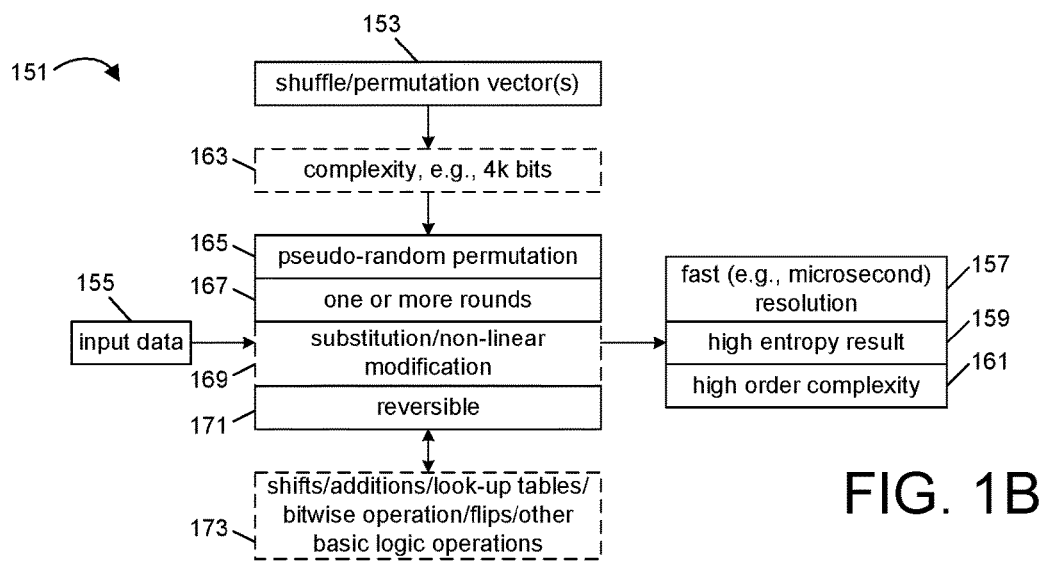
FIG. 1B is a block diagram illustrating several advantages and options of associated with the use of transposition vectors according to the teachings presented herein.

The encrypted information in one embodiment is stored in non-transitory storage or machine-readable media 117; thus, in one application, the described processes are used to securely store information for later retrieval by, and decryption by, the first user (e.g., on the same digital device 105) or for later retrieval and transmission to a different digital device (i.e., either belonging to the first user or a different user). In another application, the encrypted information is transmitted to a second digital device (105') using a modem 119, for example, being sent by wired LAN (local area network), WAN (wide area network), cellular data, Bluetooth, infrared, radio, or other communication methodology; an example of a WAN is the Internet, which is conceptually represented in FIG. 1 by cloud icon 115. Also, in yet another application, the information can be visually displayed via a display screen (121), for example, as a 2-dimensional bar code or via another means for communicating the encrypted information. Other methodologies are also possible without departing from the innovative encryption/decryption techniques described herein.

The encrypted information, as mentioned, can be received by a second digital device 105' for decryption and/or optionally stored (i.e., in non-transitory storage medium 123) for decryption at a later time. In this regard, the second digital device 105' is also provided with access to the shared key and receives, along with encrypted information, any auxiliary key (110) in clear text (or encrypted) form; if an encryption technology is also used for key exchange, encryption can take a different form (e.g., PKI, such that the auxiliary key can be encrypted using a different encryption technology; irrespective of key exchange techniques, each auxiliary key is assumed decrypted at some point and available for use in unencrypted form to perform the decryption processes (108') described herein to recover original information (107'). As before, the second digital device can include instructions stored on non-transitory machine-readable media (111') and/or circuitry 113' to perform hardware-intensive decryption processes using inverse vectors (109'). In one embodiment, the decryption processes simply performs the inverse operations of the encryption processes including "un-shuffling" any permuted characters; to this effect, the shared key 103 and any auxiliary key 110 is used to obtain the shuffle vectors 109, and to compute therefrom reverse shuffle information, such as to reorder any shuffled characters to their original order. In another embodiment, reverse shuffling is not used, but rather, the original information (e.g., credit card number) is encrypted in parallel using the user's shared (secret) key (i.e., retrieved using provided parameters) and auxiliary keys to encrypt original data (e.g., a credit card number), with logic being used to detect correspondence (i.e., a match) with the encrypted information. Note again that both shuffling and un-shuffling processes can be easily performed using hardware-intensive processes, permitting (optionally) very long strings of input data to be processed using transposition vectors, and that further, very long keys are used in an indirect manner to generate those vectors; for example, while a conventional PKI process might employ a 256-bit (or even longer) key, which might be prohibitive to apply to encrypt long strings of text or in iterative processes, the transposition processes described herein, because they are applied to generate shuffle vectors, can use relatively long keys (e.g., thousands of bits) to generate complex shuffle vectors (e.g., in some embodiments consisting of hundreds to thousands of character sorts), which can then be readily applied to segments of input strings of arbitrary length. FIG. 18 helps underscore some of these advantages.

For example, numeral 151 of FIG. 18 refers to the use (153) of one or more shuffle vectors to encrypt of decrypt input data (155). As reflected by numerals 157, 159 and 161, the described processes, include the shuffling or transposition of characters derived from the input data (and optionally including additional processes) to take a different form); this provides for very fast processing, permitting the encryption of even very long strings of data in microseconds, with a very high entropy result, and very high order complexity. The result has very high entropy because, in many embodiments, very slight changes in input data create very significant differences in the encrypted data, rendering it increasingly difficult to attack encryption via a statistical or birthday style attack. The complexity of encryption can be very high order because of very long key length, and the complexity of the encryption processes. As referenced by numerals 165, 167, 169 and 171, the described processes uses pseudo-random permutation (based on the one or more transposition vectors, which are derived from the shared key and any auxiliary key(s)), and can be applied in the form of multiple, sequential rounds that repeatedly permute and then repermute operands, that rely on one or more non-linearly substitution or modification processes to further enhance complexity, all in a manner that can be made reversible to derive original input data. As reflected by numeral 173, advantageously, some or all encryption operations (e.g., once the various keys have been created and/or selected, and the transposition vectors have been derived from the various keys) can be performed by hardware logic in a manner that performs shifts, additions, look-up substitutions or other modifications, bit flipping operations, bit-wise processing or other basic logic operations. That is, with hardware that directly exchanges operands and results with other hardware units as a function of wiring and circuit design; such operations can be optionally orchestrated under the control of software, for example, that passes operands and results between multiple circuits (e.g., discrete integrated circuits or "ICs") or that controls the acceptance of inputs or the output of results.

Figure 2A:
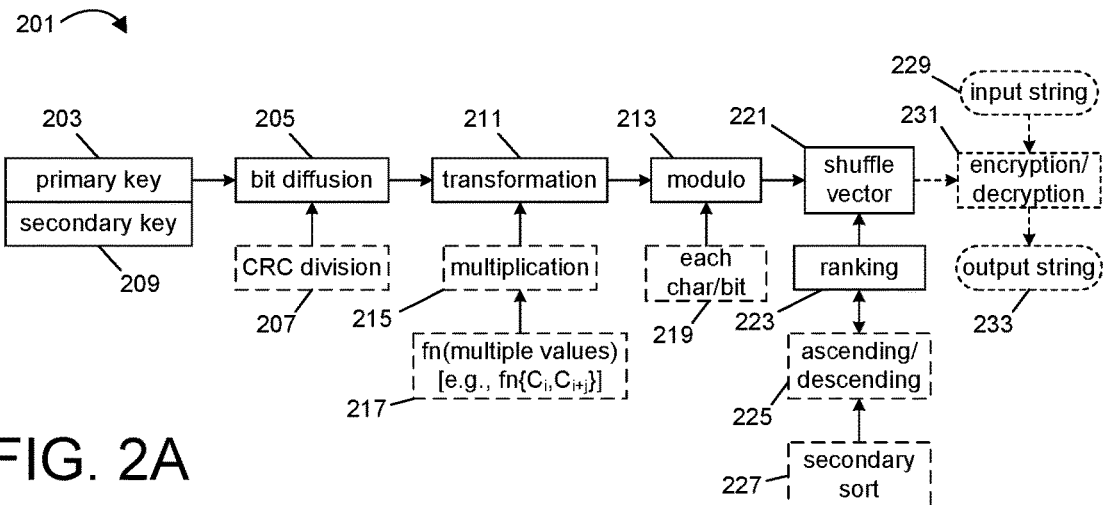
FIG. 2A is a flow diagram that illustrates techniques for deriving a transposition vector from a secret (primary) key and one or more secondary (or "auxiliary") keys.

FIG. 2A provides additional detail regarding one method for deriving a shuffle or transposition vector; as noted earlier, some processes can use a single such transposition vector and some processes can use multiple transposition vectors, for example, derived from the secondary or auxiliary key 209. As denoted by numeral 205, the primary key (and optional auxiliary key(s)) are first subjected to a bit diffusion process, which uses avalanche effect to propagate slight changes in the input (key values) to changes that affect many bits and so increase the entropy of results. This diffusion process can be applied simply to diffuse bits of the auxiliary key(s) or can be applied to the primary key or both the primary and auxiliary keys. Per numeral 207, one example of such a bit diffusion process is a CRC division. Nearly any CRC process can be used; as one example, the keys in one embodiment are converted to binary form, are combined or otherwise concatenated, and are divided using a CRC32 polynomial. To illustrate these techniques, an example input string of "A-Random-Primary-Key!" and an auxiliary key of "AuxKey8" and a CRC polynomial of $x32+x26+x23+x22+x16+x12+x11+x10+x8+x7+x5+x4+x2+x+1$ will be assumed. The input string and auxiliary key can each be converted to ASCII format, such as 41-2D-52-61-6E-64-6F-6D-2D-50-72-69-6D-61-72-79-2D-48-65-79-21 (21 bytes), and 41-75-78-48-65-79-21 (8 bytes). The auxiliary key in this example can be prepended to the primary key to form a 28 byte sequence of 41-75-78-48-65-79-21-41-2D-52-61-6E-64-6F-6D-2D-50-72-69-6D-61-72-79-2D-48-65-79-21 (28 bytes), which is then converted to binary form, i.e., as a sequence of bits. Dividing the resulting bit sequence by the CRC polynomial (e.g., by 100000100110000010001110110110111) and recording the least significant byte of the quotient at the corresponding least significant byte (LSB) location of the 28 byte sequence creates the value of "74-F7-A 7-E6-44-02-E6-8E-30-F2-69-92-19-53-3F-67-A6-10-C0-9A-13-AB-6E-06-DA-9D-4D-83" (28 bytes) of which only the positions corresponding to the primary key (i.e., the last 21 bytes in this example) are retained. This yields the sequence "8E-30-F2-69-92-19-53-3F-67-A6-10-C0-9A-13-AB-6E-06-DA-9D-4D-83." The auxiliary key in this example thus serves as a seed value or initial value that randomizes the result of the CRC32 division. As will be described below, a bit wrapping feature can also optionally be used, e.g., the 28 bytes referenced above can be replicated to create a 56-byte sequence, with only a group of least significant (or other) bytes of the quotient being extracted for use, i.e., further enhancing bit diffusion. Many variations are possible. Note also that instead of CRC division, any hashing process can be used for purposes of creating a running sequence of hashed values in a manner similar to that indicated above, on a byte-wise or other basis. This division process effectively applies some form of bit diffusion to create a high-entropy result, as previously described, and such bit diffusion is preferably at least applied to diffuse differences in the auxiliary key; for example, if the same input string of "A-Random-Primary-Key!" were used in this example but with an auxiliary key of "AuxKey9," the resulting output would preferably feature significantly different results (i.e., many changed bits of the corresponding output, relative to the example just discussed) based simply on a slight difference in the initial value.

Per numeral 211, a transformation process is then applied to the resulting byte array, in this exemplary case, the transformation is applied to the sequence "8E-30-F2-69-92-19-53-3F-67-A6-10-C0-9A-13-AB-6E-06-DA-9D-4D-83." This transformation process is typically a per-byte mathematical process that uses functions such a multiplication (215) and operates on multiple byte values (217) in the sequence to increase the complexity of results. In one embodiment, the mathematical function can be selected to be Result=(Byte[i]*17+IntegerValue*(1+Byte[i+1]), modulo 4096. In this example, the value "Integer Value" is a randomizing value obtained by hashing the mentioned sequence (e.g., by applying the mentioned CRC32 function), to obtain a value, and applying finite field math (a modulo of a chosen prime number) to the result; for example, if the prime number is chosen to be 659, then the result for the 21-byte sequence mentioned above is 272. Finite field math is then applied on a byte-wise basis to the results of the transformation, i.e., as denoted by the term "modulo" at box 213. For example, such an operation, with a well-chosen finite field space, generates per-character (e.g., per-byte) remainders that render it difficult to deduce the original key values from results of this operation. Note that the transformation function is to a certain extent arbitrary, i.e., a wide range of different functions can be equivalently selected; the function is, however, advantageously selected so as to facilitate this end, i.e., such that the primary key cannot be deduced from any resulting shuffle or transposition vector 221. Also, as indicated by box 219, in one embodiment, processing is applied on other than a byte-wise basis, i.e., to any groupings of one or more bits.

In the case of the sequence, "8E-30-F2-69-92-19-53-3F-67-A6-10-C0-9A-13-AB-6E-06-DA-9D-4D-83" and the function Result=(Byte[i]*17+272*(1+Byte[i+1]), modulo 4096, the results of transformation, following the application of finite field mathematics, are {3454, 1376, 178, 809, 1362, 2793, 2435, 687, 2119, 3350, 3616, 368, 3962, 2051, 331, 3774, 2326, 1626, 3405, 349 and 163}. These values are subsequently sorted or ranked (223) according to a desired soft criteria, typically ascending numerical order (225). Note that even with a complex transformation function, there still can be "ties" that render it difficult to uniquely sort these numbers; optionally, therefore, a second function (227) can be applied and used to arbitrate ties. For example, in one embodiment, the original "untransformed" values (that resulted from the bit diffusion process) can be resorted to and used to order "tie" values. In another example, a second mathematical function is applied to determine an auxiliary sort index, e.g., ASI=(i*83), modulo 256, is applied to generate associated sort numbers {0, 83, 166, 249, 76, 159, 242, 69, 152, 235, 62, 145, 228, 55, 138, 221, 48, 131, 214, 41 and 124}, one for each character (or byte or other grouping of bits) of the primary key. Pairing the ranking value with the sort index for each byte position yields {0:3454-0, 1:1376-83, 2:178-166, 3:809-249, 4:1362-76, 5:2793-159, 6:2435-242, 7:687-69, 8:2119-152, 9:3350-235, 10:3616-62, 11:368-145, 12:3962-228, 13:2051-55, 14:331-138, 15:3774-221, 16:2326-48, 17:1626-131, 18:3405-214, 19:349-41, and 20:163-124}. This array is then sorted according to the ranking value, with ties decided according to the sort index, which then yields the result {20:163-124, 2:178-166, 14:331-138, 19:349-41, 11:368-145, 7:687-69, 3:809-249, 4:1362-76, 1:1376-83, 17:1626-131, 13:2051-55, 8:2119-152, 16:2326-48, 6:2435-242, 5:2793-159, 9:3350-235, 18:3405-214, 0:3454-0, 10:3616-62, 15:3774-221 and 12:3962-228}. This sorted result provides the information identifying the transposition vector, i.e., the $21^{st}$ input character (character 20) is to assume the first position in a sorted or transposed sequence, the 3d input character (character 2) is to occupy the second position, the $15^{th}$ input character (character 14) is to assume the next position, and so on. The shuffle or transposition vector (221) is then said to be described by 0<20, 1<2, 2<14, 3<19, 4<11, 5<7, 6<3, 7<4, 8<1, 9<17, 10<13, 11<8, 12<16, 13<6, 14<5, 15<9, 16<18, 17<0, 18<10, 19<15 and 20<12.

The transposition vector (221) is then applied to perform encryption, or conversely, inverted in order to perform decryption. For example, for the values just presented, the inverted vector is described by 0>20, 1>2, 2>14, 3>19, 4>11, 5>7, 6>3, 7>4, 8>1, 9>17, 10>13, 11>8, 12>16, 13>6, 14>5, 15>9, 16>18, 17>0, 18>10, 19>15 and 20>12.

This transposition vector (221) is applied to an input string 229 as part of an encryption/decryption process (231), to process each of one or more segments of an input string 229 (i.e., of a quantum of characters equal in length to elements in the transposition vector), and to generate an output string 233 from this processing. Again, in many embodiments, other cryptographic operations are also performed in addition to character transposition. In an encryption process, the output string is encrypted relative to the input, and in a decryption process, the output is decrypted relative to the input.

Note that while the transposition vector (221) in this example was derived on the basis of bytes, the transposition vector once derived can be differently applied. In one encryption process, discussed below, the transposition vector (221) during encryption/decryption is applied to bits of a sequence on a segment-wise basis, where the number of bits in each segment is equal to a length of the transposition vector. This need not be the case for all embodiments. For example, one contemplated text encryption/decryption embodiment (see the discussion of FIGS. 10A-C below) computes two transposition vectors and applies a first to a first group of bits, to transpose those bits in a first manner within a segment (e.g., the upper half of each byte in the segment), and applies the second to differently transpose a second group of bits (e.g., to differently shuffle the lower half of each byte in the segment). Naturally, this technique can be extended to apply vectors to any set of one or more bits, and is not limited to byte-wise application. In fact, in one embodiment, multiple transposition vectors can be applied on a variable basis, either varying the set of vectors to be applied from segment-to-segment, or varying sets of bits against which individual vectors are mapped. As these examples demonstrate, it is possible to use multiple transposition vectors in an encryption/decryption process. In yet another example discussed below, multiple transposition vectors are generated and are then applied in successive processing rounds, to scramble input data in a very complex manner.

Note that in this example the order of variations in the CRC32-quotient is limited to $2^{32}$, which corresponds to the length or order of the CRC polynomial. This limitation can be effectively bypassed if the primary key is partitioned into multiple segments with the auxiliary key inserted in between the segments. Byte-wise (or bit-wise) CRC-results are only harvested which corresponding to the primary key segment positions while data corresponding to the inserted auxiliary key positions are discarded. In this manner, if the primary key can be partitioned 8-times (into 8 segments with the auxiliary key inserted once before each segment) to effectively boost the complexity of the auxiliary key from 32 bits ($2^{32}$) to 256 bits ($2^{256}$). Clearly, many extensions of these principles are possible and will occur to those of ordinary skill in the art.

As referenced earlier, slight differences in each auxiliary key diffuse to substantial variations in the derived transposition vector, and this characteristic facilitates ready application of the described techniques to generate a range of very different vectors based on deterministically-related auxiliary keys, e.g., a user can be called upon to supply user-specific data (e.g., a password, identity, email address, user ID or other data) for use as the auxiliary key, and software can modify this auxiliary key data in a standardized manner to deterministically create a set of different auxiliary keys; for example, if the user-specific data were bobjones@acme.com, software could create 4 keys in a standardized manner as bobjones@acme.com1, bobjones@acme.com2, bobjones@acme.com3 and bobjones@acme.com4. Using the processes described above, each of these keys would result in significantly different transposition vectors. In addition, results can be further randomized if desired by adding other variables to the auxiliary key; for example, adding a time stamp contemporaneous with the encryption results in a situation where no two auxiliary keys for different encryption processes are ever the same (i.e., even if based in a common root, such as a user ID). In several of the embodiments described below, both of these processes are used, that is, encryption software accepts user data and adds a numerical identifier in the manner described, to create multiple auxiliary keys and, further, sums a time stamp (or other) value with each auxiliary key to further randomize that key. Note also that it is also possible to use second or third encryption factors—for example, in addition to the use of a secret primary key, a user password can also be used and combined in some manner with the auxiliary key; for example encryption software can in one embodiment also be made to accept a user password, which is then combined with the auxiliary key(s) and used to generate the transposition vector(s). Multiple keys can be used in a variety of manners, i.e., one encryption/decryption process referred to below uses 8 different auxiliary keys for encryption. Many variations and applications of multiple keys are possible and will readily occur to those skilled in the art.

Whichever process or variant is used, and however many transposition vectors are generated, to generate each transposition vector, one or more auxiliary keys are concatenated with the user's primary key, as discussed above, and used to generate the transposition vector. If it is desired to transmit encrypted data to a different entity for decryption, then each associated auxiliary key is transmitted to that different entity for decryption, e.g., encrypted data can be transmitted together with clear text versions of the underlying auxiliary keys to the recipient. For example, if one auxiliary key is a user ID or a common root used to deterministically derive keys, then such information (e.g., a user ID such as bobjones@acme.com and any randomizer such as the time stamp value) are conveyed by headers which permit the decryption software to "understand" according to convention or specification how each of the auxiliary keys is to be combined and any key variants are to be calculated; these values are concatenated with the shared (but secret) primary key at the destination, and used to derive the various transposition vectors needed for the decryption or authentication process.

Figure 2B:
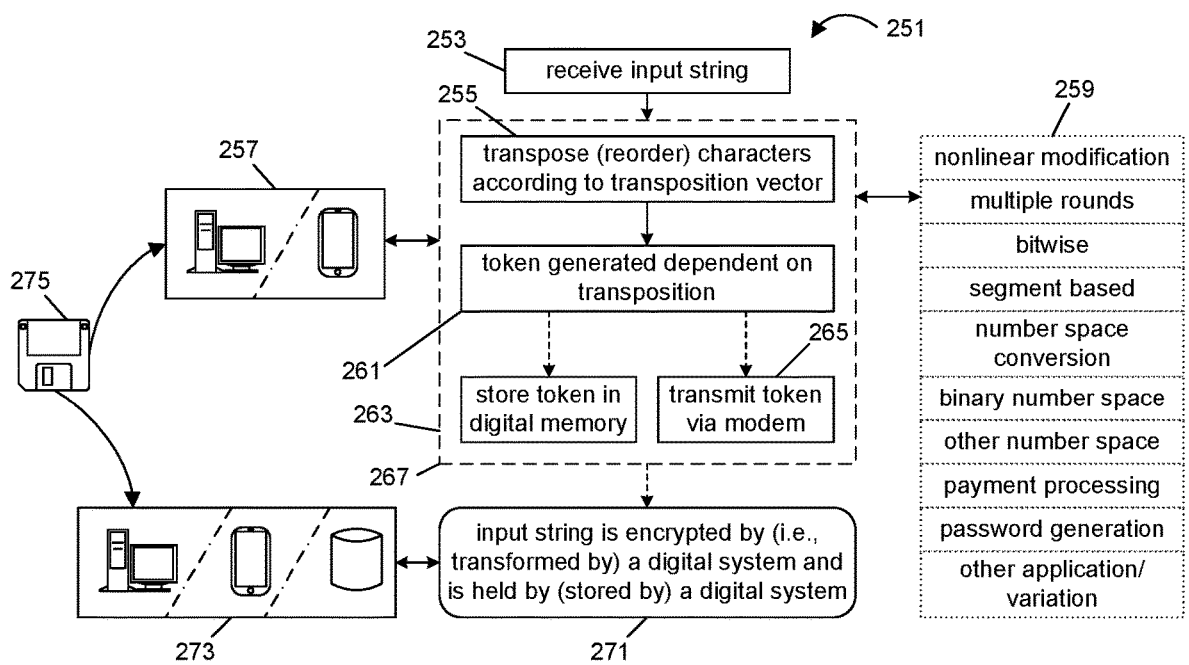
FIG. 2B is an illustrative diagram that is used to explain application of one or more transposition vectors to token generation.

FIG. 2B is used to illustrate application of one or more transposition vectors to token generation, with described techniques being generally illustrated by numeral 251. More specifically, an input string is received (253) by a processor-based system (267) and is subject to an encryption process that includes transposition (255, i.e., reordering) of characters within or derived from this string. Note once again that "characters" can refer to individual bits or predetermined groups of bits and that this reordering does not necessarily have to occur at byte boundaries. As denoted by numeral 257, in one embodiment, the encryption system is embodied in software (275) resident on (or downloadable to) a digital device, such as a computer, tablet device, smart phone, embedded system, or other device having a processor; as this example underscores, in one contemplated application, each device (e.g., each smart phone) independently includes software for generating encryption and/or tokens using transposition vectors based on a secret key, as introduced previously. Also the encryption process can take any number of forms that includes optional additional processing, for example, non-linear modification or substitution, multiple rounds of encryption (i.e., with or without additional character transposition), bitwise processing, segmentation of the input string (e.g., to fixed length strings), number space conversion, the use of a binary number space or other number space, and so forth, all as represented by reference numeral 259. As also represented by numeral 259, the process can also be applied in a number of manners, for example, to payment processing applications, password generation, and other applications. A token is generated from the input string dependent on character transposition, as represented by numeral 261, and is stored in digital memory or is transmitted to another device via modem, as represented by numerals 263 and 265. Note the result 271 that the input string is encrypted by (i.e., transformed by) the digital system 267, and is also held by (i.e., stored by) a digital system. In one embodiment, the storage can occur on processor-based system 267. In another embodiment, the storage can occur on a second digital system (i.e., represented by numeral 273). Thus, as an example, the token can be generated on the fly on a first digital system, transmitted by modem to a second digital system (e.g., as a form of electronic payment or credentials presentation) and stored on or by the second digital system.

Figure 3A:
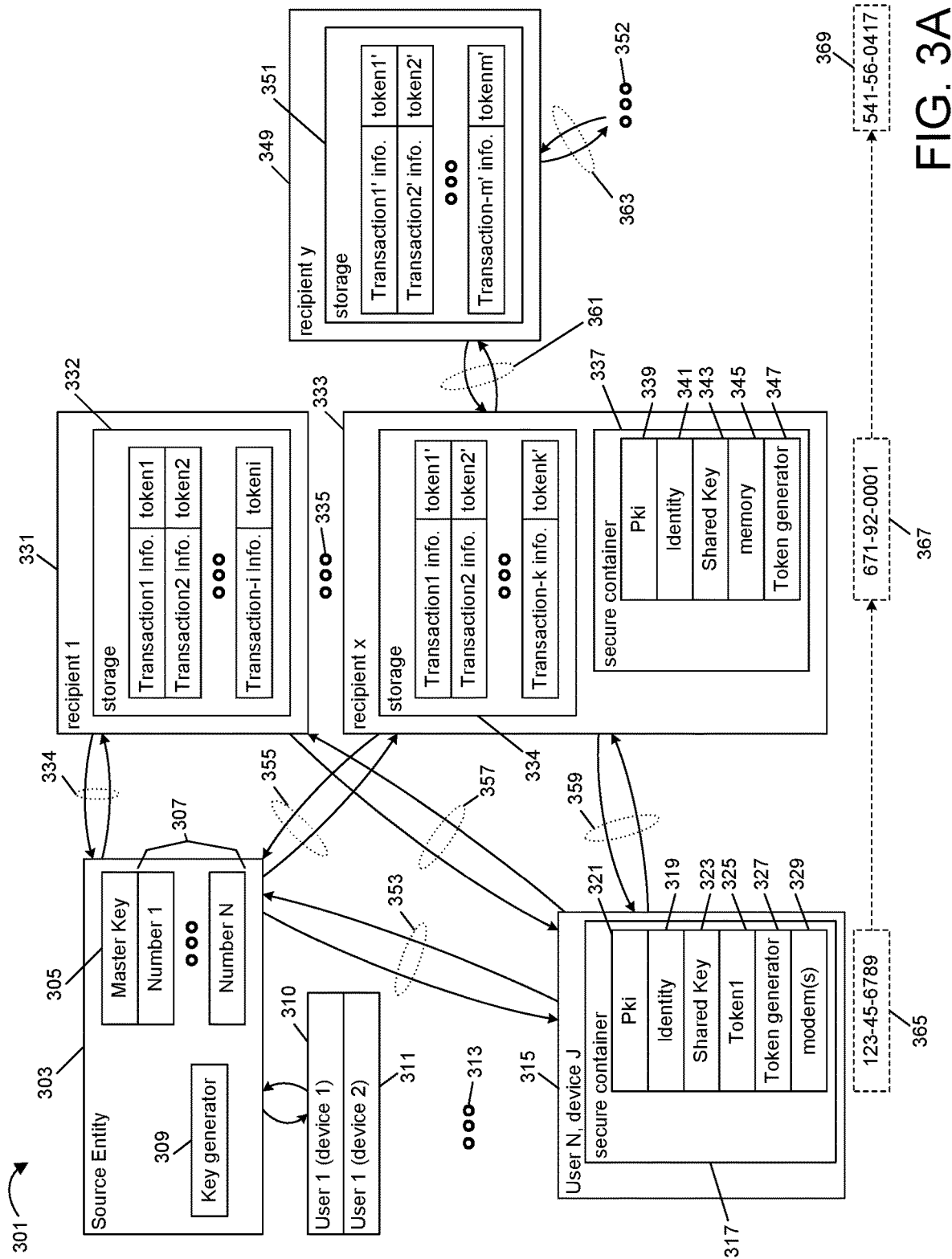
FIG. 3A is an illustrative diagram used to explain application of one or more transposition vectors to token generation, exchange and usage.

FIG. 3A is an illustrative diagram used to explain such a process in additional detail. The flow depicted in FIG. 3A is generally referenced by numeral 301. More specifically, FIG. 3A exemplifies an application, where a source entity (e.g., a credit card company, the government or other credentials provider 303) is providing credentials that are to be encrypted so that they will not be discovered and/or forged. The source entity has a master key (305) that it does not share with anyone and a database (307) that stores credentials and account information for a multitude of users. For example, where the source entity is a credit card company, the database can store credit card numbers, expiration dates, user names, user addresses, contact phone numbers, and other information associated with credit card maintenance.

Note that the term "credentials" can apply to many other types of information, such as social security (or other identity numbers), digital cash or gift cards, and many other types of information. The source entity also has a key generator 309 which it uses to generate a shared key unique to each user. A number of users are depicted at the left-hand side of FIG. 3A, including a first user (user 1), who is seen to have two different devices (device1, device 2) and user N, who is seen to have device J. User 1's first device (device 1) is generally referenced by numeral 310, User 1's second device (device 2) is generally referenced by numeral 311, and User N's device (device J) is generally referenced by numeral 315, with ellipses (313) used to denote that there may be many other users. Device J (315) is depicted in expanded detail and will be used for purposes of discussion.

In this example, it is desired to permit each device (for example, a smart phone, tablet, computer) to store an independent token without actually storing the user's credential thereon. For example, if User 1 has a credit card number or social security number, in the depicted embodiment, that number is not itself stored on the user's two devices, but rather, a token is generated as a proxy for that credential. In the event of loss or compromise of one of the user's devices, the respective token can be revoked without needing to review the user's underlying credential. For example, if the credential is User 1's social security number and device 1 is User 1's smart phone, and User 1 subsequently loses his or her smart phone, the credential associated with that device can be revoked without discovery of or compromise of the user's underlying social security number.

In the case of FIG. 3A, it should be assumed that the underlying credential is indeed a social security number (i.e., a 10 digital decimal number) and that it is desired to at all times use a token instead of this number so as to minimize the effects of any interception and/or compromise.

To this effect, the User N's device J (315) is seen to have a secure container 317, for example, consisting of a secure processor or core and/or secure memory; for example, many smart phones currently use multi-core systems where the operating system or systems (or individual applications) partition use of the hardware, such that code executing in one partition cannot directly gain access to data or files created by or stored in another partition, and where files stored in a secure partition are inaccessible by external connections or software. As referenced by numeral 321, such a secure container includes public key infrastructure (PKI) software rooted in a secure device key. This software interacts (353) with the source to create and establish an identity (319) unique to the particular device (device J), for example, "Bob's Smart Phone," and to receive a shared (323) key which is then stored in the secure container. The identity 319 preferably is of sufficient complexity so as to be unique, that is, neither shared by User N's other devices, nor shared by any other device of any other user (and, thus, is typically either more complex than "Bob's Smart Phone," or is combined with other credentials fields so as to distinguish the user). The shared key 323 is an example of the shared secret key referenced in connection with FIG. 1A (element 103). The shared key can be a random code or can be generated using the source entity key generator 309 such that it is statistically very unlikely that the same key will be shared by any other individual or device; for example, a key can be selected on the order of 4 k bits in length, or longer if desired.

In addition to the shared key, the device (i.e., User N's device J, 315) also receives a token 325 which is an encrypted version of the credential at issue (e.g., a social security number) generated using the master key of the source and using a format preserving encryption (FPE) technique. For example, if the user's social security number is 555-01-0000, then the source entity 303 might generate a token of 123-45-6789, referenced in FIG. 3A by box 365. This token is generated such that only the entity holding the master key can recover the original credential (i.e., social security number 555-01-0000). As this example implies, preferably, the master key of the source is as complex as possible and feasible, e.g., also preferably at least 4 k bits in length. The device (i.e., User N's device J, 315) is also depicted as including its own token generation software 327 and one or more modems 329, used to exchange information as will be further described below.

FIG. 3A illustrates two different use examples, which are respectively described with reference to a first recipient (recipient 1) and a second recipient (recipient x), reference in the middle of the FIG. by reference numerals 331 and 333, respectively. As with the multitude of users, there can potentially be many other recipients, as conceptually denoted by ellipses 335 in the middle of the FIG. Each of these use cases will be discussed separately.

First, it should be assumed that User N wishes to provide his or her credential (the token 325) to recipient 1 and that recipient 1 and will store this information in digital storage (332) or otherwise use this information to authenticate the identity of recipient 1. In this regard, User N engages in a transaction (357) with recipient 1 (331) and provides User N's token (325) together with transaction information that permits an entity (e.g., the source entity) to verify the authenticity of User N's token (325); for example, User N can transmit his or her identity (319) together with the token. To this effect, recipient 1 stores the token and associated transaction information (i.e., including the identity for User N, device J, 325) and at that time or at a later point in time (e.g., via exchange 334) provides this information to the source entity 303. For example, such an exchange can be performed in real time, contemporaneous with exchange 357, or as part of a batched process during which many credentials for respective users are authenticated. Possessed with a unique ID for a user and associated token, the source entity (303) can retrieve the associated underlying credential (e.g., social security number 555-01-0000) and the shared (secret) key associated with a particular user (e.g., User N), and it can therefore verify the accuracy of the token and thus the authenticity of User N. The source entity thus transmits a signal as part of exchange 334 that confirms the authenticity of User N to recipient 1.

As to the second use example, it is assumed that User N is to transmit his or her token to recipient x, but also that recipient x will not itself store that token (but will further encrypt or tokenize that information using FPE). That is, for example, User N will transmit his or her token 325 as a first token (e.g., token1) to recipient x via exchange 359, and recipient x will convert this first token to a second token (e.g., token1'), which it will then store or further transmit in a manner where User N's original token 323 cannot be discovered from the second token. As a hypothetical example, it is supposed that User N wishes to provide his or her token (325) in connection with a mortgage application to a bank, and that recipient x is a bank wishes to store a representation of this token and provide it to a lender as an authentication mechanism for indefinite use in authenticating User N (e.g., in a manner associated with User N's identity 319), but in a manner where such information cannot be misused (e.g., by a nefarious employee of the bank, recipient x).

To this effect, FIG. 3A also indicates that recipient x also interacts with the source entity, via exchange 355, to obtain a shared (secret) key 343 and identity 341 which are unique to recipient x; as an example, recipient x; can also have a secure container 337 (e.g., implemented on a mobile device, computer, server or other type of system), for example, with its own PKI software 339 and token generation software 347). When and as User N presents his or her identity 319 and token 325, the token generation software 327 of recipient x adds new transaction information (for example, the identity 341 of recipient x as an additional header, with or without other information (such as a time stamp), and uses its shared (secret) key 343 and such additional information (i.e., as an auxiliary key) to further tokenize User N's token 325. Thus, for example, if User N's token 325 is 123-45-6789, then recipient x's token generation software might generate the number 671-92-0001 (referenced in FIG. 3A by numeral 367), which recipient x can then store in storage 332 as, e.g., token 1'. As with the example before, if recipient x is hacked or compromised, it becomes possible to revoke token 1' without affecting the validity of User N's token 325, and it is impossible to discover User N's token 325 without recipient x's shared (secret) key 343 and the associated additional information (auxiliary key). Recipient x, when it receives the token 325 from User N, temporarily stores this token in secure memory 345 for purposes of encryption operations, and it then writes the further tokenization of this value into memory 332 for use by other systems (and employees of) recipient x. Continuing with the example of a mortgage loan application, recipient x can provide stored tokens (e.g., token 1') together with associated headers (e.g., identity 319 and identity 341) to yet a further recipient (recipient y) as part of exchange 361, and recipient y can then store this information in storage 351 and authenticate User N in much the same manner as described above for recipient 1. For example, the stored information including the token 671-92-0001 and associated transaction information (e.g., Transaction1' information) can be used by the source entity to recover the User N's token 325, e.g., 123-45-6789, and from there to authenticate User N's token as previously described. As implied by exchange arrows 363 and ellipses 352, further tokenization is also supported on an indefinite basis, e.g., a subsequent recipient can use FPE to convert token 671-92-0001 to token 541-56-0417, as implied by numeral 369, and so on, all in a manner that is completely reversible back to the original credential in database 307 by one having each of the shared secret keys used for the various rounds of tokenization.

Figure 3B:
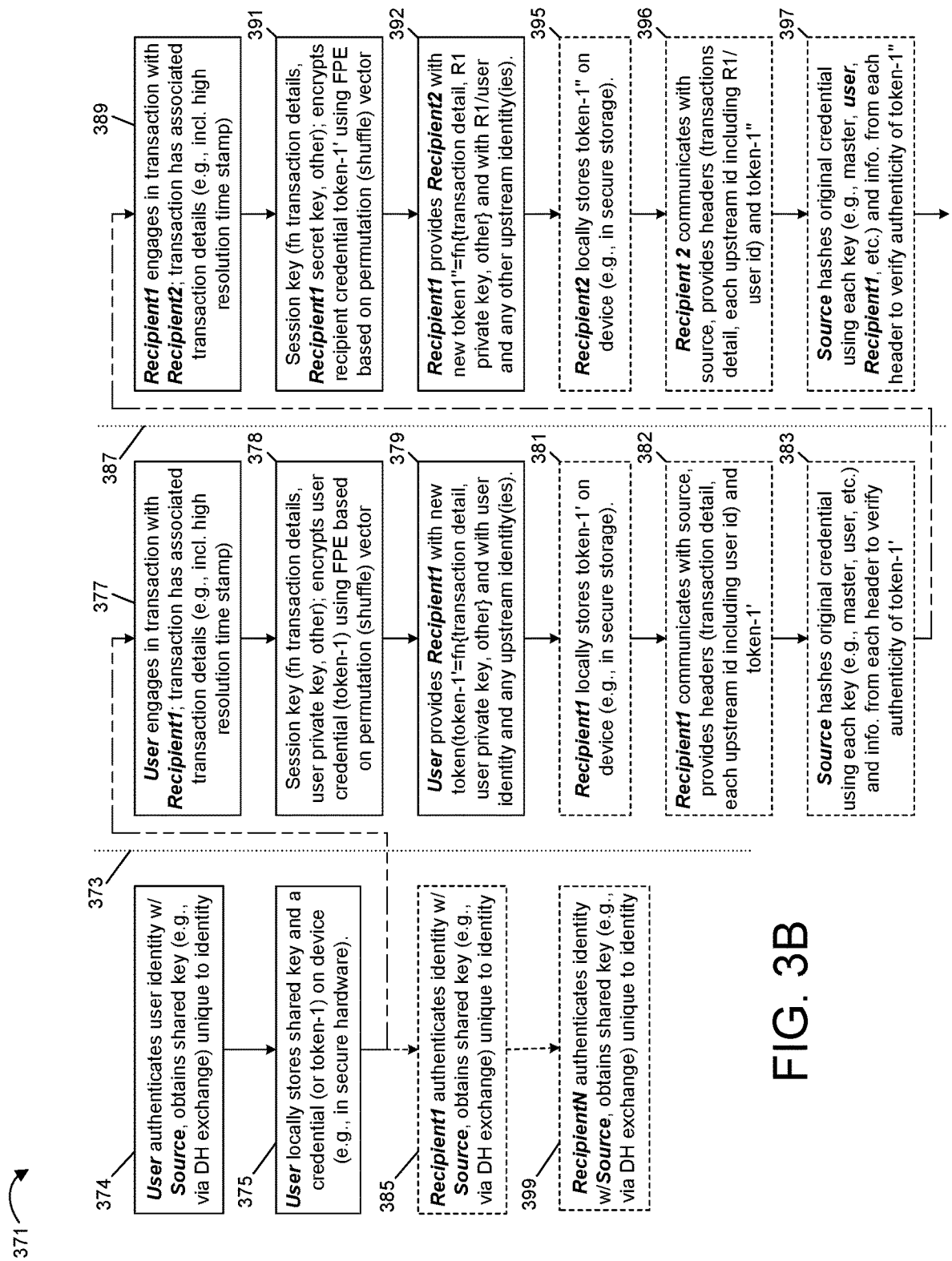
FIG. 3B is a flow diagram used to explain one exemplary application of tokens generated according to the principles discussed herein.

FIG. 3B is a flow diagram used to explain one exemplary application of tokens, similar to the use models just presented. Flow in FIG. 3B is generally represented by numeral 371.

More specifically, FIG. 3B is separated into roughly three vertical columns, separated by lines 373 and 367, which represent time-separated classes of activity. As represented in the left-most column, that is, to the left of vertical separation line 373, individuals authenticate their identity with a source of a credential (and of encryption technology in general) and obtain a shared key (e.g., via a Diffie-Hellman exchange procedure, DH). The shared key is known in this particular example only to the source entity that issues the credential and to the receiving user; in some models, a user can have an independent key for each device or identity of the user, and in other models, a single key is provided to each user. In addition to obtaining a shared (secret) key, each user also establishes an identity and obtains an encrypted credential (such as for example, using FPE as described in connection with the previous FIG.). The credential may be shared, the shared (secret) key is kept secret and is preferably not stored outside of secure hardware, that is, is preferably kept in a manner that is not externally accessible or discoverable. In one embodiment, as previously discussed, the shared (secret) key of each user is generated by the key generator of the source entity, and the credential or token is generated using user identity information (i.e., as an auxiliary key) and the source entity's master key (e.g., such that the token is derived from an underlying user credential such as a credit card number, social security number or similar personal data). Preferably also, the credential provided to the user is unique to the particular device (e.g., smart phone). These actions are variously represented in FIG. 3B by numerals 374-375 and are represented to the left of line 373 to denote that they are an offline process, that is, are performed at an indeterminate point in time before steps depicted to the right of line 373.

Note that it was earlier mentioned that the user in question presents his or her encrypted credential to one or more recipients, and further, that some use models support further tokenization by the recipients (and forwarding to further recipients, and so on). Such retokenization, if desired, can be supported on an indefinite basis, with complete reverse recovery of the underlying credential (e.g., credit card number) or any intermediate token by one possessed of all the necessary shared keys. To this effect, FIG. 3B also indicates, via dashed-line boxes 385 and 399, that any number of recipients can also obtain their own shared (secret) key from the source entity to support further tokenization, as has previously been described. When a user later presents these recipients with the user's token, the recipients in question can further tokenize received token using transaction information, and the shared (secret) key and identity of the recipient, to render it infeasible to try to derive the user's token from what is stored or further shared by the recipient. Such a scheme is particularly suitable for a digital cash model where, for example, each token is encrypted with a time stamp or counter, also used in some manner as part of the auxiliary key, and the source entity uses software that permits each token to be redeemable only once (e.g., the source entity repudiates attempts to authenticate the token which are anything other than the first authentication attempt). Once again, in the examples described in connection with this FIG., it is assumed that FPE is used for the credential encryption processes.

The middle column of FIG. 3B, that is, the area between vertical lines 373 and 367, represents transactions between the user and one or more recipients where the user's encrypted credential is presented or otherwise relied on. For example, as referenced by numeral 377, a specific user can engage in a transaction with a first recipient, e.g., Recipient 1. In this particular example, the user further tokenizes their encrypted credential, such that the user's stored encrypted credential is not shared, but only a 1-time tokenized version of it is shared. For example, if it be assumed that Recipient 1 is a merchant and that the user is consummating a purchase of goods from the merchant and wishes to use their encrypted credential as a proxy for a credit card, a session key can effectively be formed using transaction data (such as a time stamp, purchase amount, merchant identity, and so forth). This session key is used by software on the user's digital device in the manner previously described, i.e., as an auxiliary key that randomizes or otherwise varies the effects of the user's shared (secret) key. FPE is then used to generate token-1' from the user's presented token (token-1). These processes are variously represented in FIG. 3B by numerals 378 and 379; as noted by numeral 379 in the FIG., the new token (token-1') is stored in association with any upstream headers (i.e., used to generate auxiliary keys), such that this information is all that is needed by one possessing each secret (shared) key in the chain back to the original master in order to recover the user's underlying credential (e.g., credit card number).

The bottom-middle of FIG. 3B represents some optional processes. First, Recipient 1 can store the token (token-1') on a device (e.g., in mass storage, on a server, on a mobile device, etc., in secure storage if required), as denoted by numeral 381. Second, per numeral 382, if Recipient 1 wishes to authenticate the token (token-1') with the source entity, then Recipient 1 can retrieve the optionally stored data from this storage and transmit this information, together with the pertinent headers to the source entity for verification. As the source entity holds a copy of each shared (secret) key, i.e., for the user in question as well as for Recipient 1, the source entity possesses all information necessary to perform authentication (383); note in this regard that the unique identity of the user and of Recipient 1 are advantageously provided as part of the header information to permit the source entity to perform this authentication. Further, in a payment processing example, not only does the source entity confirm the authenticity of the presented token if warranted (e.g., by "approving" the transaction), but it also takes further action dependent on that approval such as for example charging the account of the user with payment information and crediting an account of Recipient 1 in a corresponding manner. Note also that if desired, the token communicated between Recipient 1 and the source entity can be further tokenized if desired.

The right-most column of FIG. 3B, that is, to the right of vertical line 387, represents optional further exchange by Recipient 1 with additional recipients, e.g., such as Recipient 2. As represented by numeral 389, Recipient 1 can engage in a transaction with Recipient 2 which requires the presentation of a credential derived from the user's original credential. To cite one possible example, previously discussed, it could be that Recipient 1 possesses a tokenized version of the user's social security number, which Recipient 1 both needs to store and forward to other recipients in connection with business engaged in relating to the original user. Recipient 1 as part of this transaction generates transaction details, which are then (per process 391) used by Recipient 1 to further tokenize the stored credential using FPE, via application of Recipient 1's shared (secret) key. As with each of the other encryption processes referred to above, the encryption process is such that it involves permutation dependent on one transposition or shuffle vector derived from the shared (secret) key, this time, the key of Recipient 1 applied as the primary key used for encryption; additional encryption processes can also be used. Recipient 1 then provides Recipient 2 with the new token (token-1") along with the pertinent headers for each accumulated encryption iteration, including identities of the user and Recipient 1, per numeral 392. As was the case before in connection with Recipient 1, Recipient 2 can store the provided credential in secure storage, and can proceed to authenticate either or both of Recipient 1 and the original user with the source entity, all as indicated by numerals 395-397. As indicated by an arrow descending from process box 397, further reversible tokenization can be supported on an indefinite basis.

With a number of general use models thus presented, this disclosure will now turn to discussion of one or more specific implementations. FIG. 4 is used to discuss derivation of a transposition vector, while FIGS. 5A-5C will be used to discuss in detail a FPE process (e.g., such as could be used for processing of a social security number or a credit card number). Following this discussion, FIGS. 6A-6C will be used to narrate a hypothetical encryption example.

FIG. 4 provides a flow diagram 401 that illustrates one embodiment for deriving a transposition vector from a secret key and one or more auxiliary keys. Beginning with a concatenation 403 of one or more secondary (auxiliary) keys and a primary key (i.e., a shared, secret key), a user derives one or more transposition vectors. As discussed earlier, more than one permutation key can be derived as necessary for encryption processes, with encryption software "automatically" generating a series of auxiliary keys from a single provided key (e.g., "AuxKey1," "AuxKey2," "AuxKey3," . . . etc.). As with the example earlier, FIG. 4 exemplifies a case where "AuxKey8" is used as the auxiliary key (405a) and where "A-Random-Primary-Key" is usage as the primary key (405b). In this case, these values are treated as ASCII characters and are converted to 7 bytes and 21 bytes, respectively, of digital data, as denoted by numerals 405a' and 405b', with the auxiliary key simply being prepended to the primary key, and serving as an initial value for CRC32 division. This division is represented by numeral 407, which indicates that division occurs on a byte-wise basis, with the quotient taking the place of the original byte and any remainder being carried over to the next byte. The CRC polynomial is represented by numeral 409. The results of division are represented by a 28 byte result, with the first seven bytes of the result identified by reference numeral 411a and the last 21 bytes of the result identified by numeral 411b. Once again, CRC division is performed in this embodiment so as to perform bit diffusion (e.g., of at least the bits of the auxiliary key), and any conventional hashing process or other function serving this purpose can be substituted for this division process. As indicated by numeral 413, byte positions corresponding to the auxiliary key are discarded, leaving only the last 21 bytes 411b. Per numeral 415, an integer array having length n is then created, to sort transformed values and to perform sorting to derive the transposition vector; a depiction of the array is indicated by numeral 417. A prime number is then selected (419) along with one or more mathematical factors for use in the transformation process 423 used to transform each character resulting from CRC division, as previously introduced. For example, box 421 indicates that in one example the prime number can be selected to be 659; when applied to a hash of the integer array, this produces a numerical value which, applied modulo to the selected prime number, results in an integer ("Int") of 272 (421). This value is then applied to vary the transformation math. The manner in which this variable selection occurs can be fixed by software, e.g., can be determined by application of one or more specified mathematical operators to the auxiliary key, the primary key, or other data. The chosen transformation process is the applied to calculate a ranking value based on application of a mathematical function. For example, numeral 425 indicates use of an exemplary function $F_i=\{byte[i]*17+272*(1+byte[i+1])\}$, results in populating the byte array 417 with the indicated values. As denoted by numerals 427 and 429, a sort index can also be created using a different mathematical function to create a secondary value for each byte position, used to arbitrate between ties. The byte array 417 is then sorted to create the transposition vector, as indicated at 433.

Figure 5A:
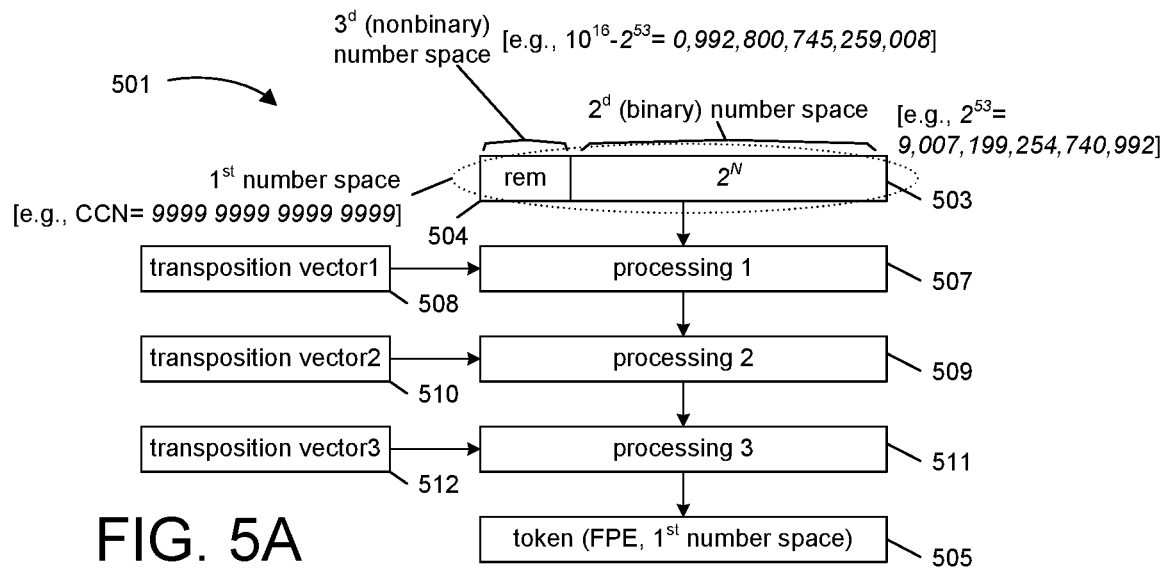
FIG. 5A is a flow diagram that illustrates one embodiment for token generation based on one or more processing rounds, using format preserving encryption (FPE).

Once the necessary transposition vectors are created, they can then be applied to perform encryption or decryption. FIG. 5A provides a high level overview 501 of one encryption process that relies upon a number of the transposition vectors. As indicated at the top of this FIG., a first number space represented by an input string if in non-binary form is converted to two number spaces, including a second (binary) space and a third (non-binary, or remainder) number space.

It should be noted in this regard that the term "number space" refers to the number of representable elements and is to a certain extent arbitrary. For example, if it be assumed that it is desired to encrypt a sixteen digital number (e.g., a credit card number) where only base-10 numbers (0-9) are permitted, then there are $10^{16}$ possible numbers that can be represented. If, on the other hand, it is permitted to have hex characters (0-F), then the very same number can be represented as one of $16^{16}$ possible numbers, e.g., even if only $10^{16}$ inputs are typically used, the number space might be said to be $16^{16}$ in size because a greater number of elements could be represented as inputs even if not used in practice.

Thus, a given set of characters can optionally be expanded to increase the length or number of digits as desired into any desired number space. For example, for an original number-space of a sixteen digital number, one can freely choose to designate the operating number-space as a 28-digital number. Thus in such a scheme, a raw input sixteen-digital number can simply be treated as an equivalent 28-digital number, where the unseen high order digits are all zero or selected to be some other character according to convention. This treatment effectively boosts complexity of the "allowed" inputs (e.g., $10^{16}$ possibilities) to a new order of $10^{28}$. Such an expansion can be advantageous for applications where additional identity-authentication or transactional information can be embedded in FPE-encoded data. For example, the twelve extra digits in this example can be used to convey any free-form or MAC-authenticating payload message that is protected by the encryption power of the FPE function, without interfering with proper decryption of the original data (e.g., a sixteen digit credit card number or "CCN"). To provide some additional non-limiting examples, these techniques can be applied to three or four digit security codes or PINs, five digit ZIP codes, expiration data and other data, optionally with randomly shifted positioning or other data processing techniques.

In the embodiment depicted by FIG. 5A, it is assumed that FPE is used and that only digits 0-9 are permitted at all times; the number space in this case is $10^{16}$, which is a non-binary number. To provide for an efficient digital hardware implementation (i.e., operating on binary numbers), the second number space (503) is selected to be the largest binary power within the first number space, in this case $2^{53}$ or 9,007,199,254,740,992. The remainder number space (504) thus consists of the remaining elements of the first number space (e.g., the highest order 992,800,745,259,008 elements of the first number space), with the binary and remainder number spaces being non-exclusive. A series of processing rounds are then applied 507, 509 and 511, in this case three rounds, to effectively encrypt whichever credit card number (i.e., whichever 16-digit number) is input; each round can optionally use its own transposition key (508, 510 or 512), though this is not required for all embodiments. For example, each transposition key can be automatically generated by software in a deterministic manner from a provided auxiliary key, e.g., if "AuxKey" is the auxiliary key, then software could create auxiliary keys of "AuxKey1," "Auxkey2" and "Auxkey3," as previously described, each to create different transposition vectors that will be used in the various rounds. One of the rounds, or all of the rounds can feature some type of transposition according to these vectors. To provide an example, in a specific embodiment discussed below, the input number (e.g., credit card number) is determined to reside in either the second number space or the third number space. For example if the input number is a credit card number of 1234-5678-9012-3456, then this might be associated with the second number space (i.e., because 1,234,567,890,123,456<9,007,199,254,740,992 and, so, is within the selected binary space) whereas if the credit card number was 9132-3512-6412-8861, then this might be associated with the third number space (i.e., because 9,132,351,264,128,861>9,007,199,254,740,992 and is outside of the selected binary space).

In processing round 1 (507), the input number is not processed if it is the third number space but, if it is in the second number space, its bits are transposed and otherwise processed according to a first transposition vector (with or without additional encryption processing). In processing round 2 (509), these number spaces are reallocated, i.e., the transposed second number space will result in a credit card number being mapped to a different number <9,007,199, 254,740,992) and the overall number space is reallocated, this time taking the highest $2^{53}$ (9,007,199,254,740,992) numbers to be in a fourth (binary) number space and the lowest 992,800,745,259,008 numbers to be in a fifth (non-binary or remainder) number space, that is mutually-exclusive to the fourth number space. Once again, if the (now-potentially-scrambled) number is in the fifth number space, it is left alone, whereas if it is in the fourth number space, its bits are permuted according to yet another transposition vector (i.e., derived in the manner exemplified above). For example, if the result after processing round 1 (507) is a number of "9,132,351,264,128,861," then 992,800,745,259, 008 would be subtracted from this number and the associated bits of the remainder would be transposed and, following transposition, 992,800,745,259,008 would be added back into the result (i.e., to essentially "shuffle" the number within the fourth number space). By picking the third number space and the fifth number space to be mutually exclusive, this ensures that two processing rounds are necessarily effective to shuffle the input string according to at least one transposition vector (and quite possibly two) notwithstanding where the input is within the first number space. Note that this is not required for all embodiments— for example, if the input space is binary, it becomes unnecessary to treat the input according to disparate number spaces. Also, if the third and fifth number spaces were permitted to partially overlap, the same (shuffled space) result could be obtained via additional processing rounds that "precess" the number space of the input string such that each and every possible input value is necessarily shuffled or permuted during at least one processing round. Many examples and variations are possible. In the given example represented by FIG. 5A for example, the third transposition vector 512 is not used, and the third round of processing 511 optionally comprises additional encryption techniques such as discussed below in connection with element 539 of FIG. 5B. Once processing is complete, the result is a token 505 having the same format as the input data (i.e., in the same number space, i.e., a sixteen digit decimal number). Presented with the user-identity, if the token does not match the user's credit card number, and if the encryption of the credit card number according to accompanying headers to not produce the same result as the token 505, then the token is deemed not authentic and a service based on authentication (e.g., payment processing, website or service admission, etc.) can be refused.

Figure 5B:
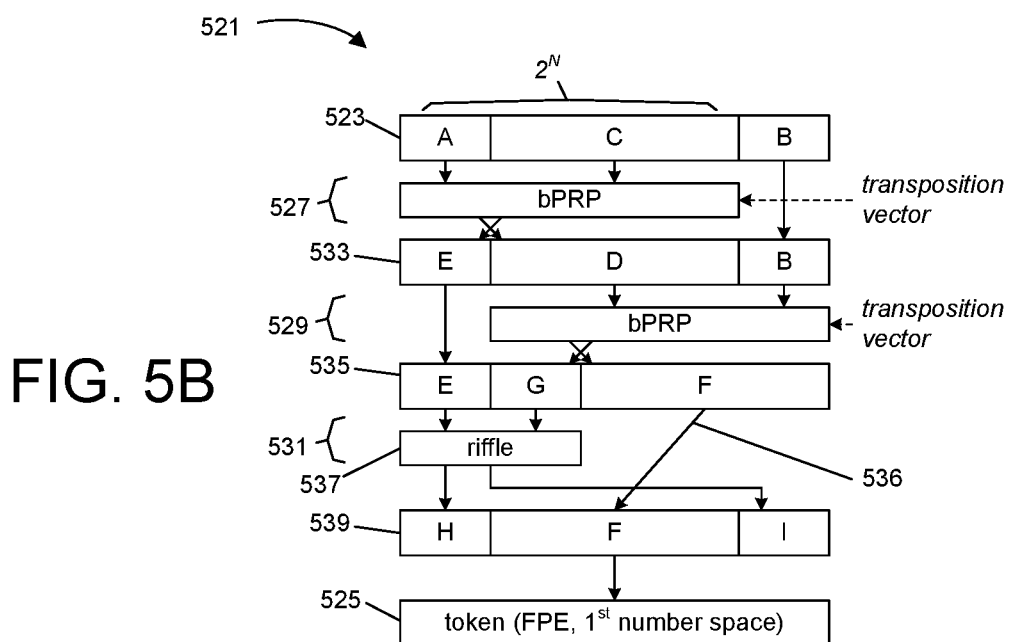
FIG. 5B is a flow diagram showing encryption details associated with the processing rounds from FIG. 5A.

FIG. 5B provides yet another example 521 of processing implemented by the embodiment just described. In connection with FIG. 5B, letter designations will be used to explain the concepts of the various number spaces just introduced and, once again, it is assumed that the input (first) number space (A||B||C) is non-binary, e.g., a 16-digit (base-10) number. Per numeral 523, the first number space is subdivided into a second, binary space ($2^N$) comprising the union of sets A and C (A||C) and a third, remainder space B. Once again, the binary space is chosen to be the largest binary power within the first number space. In this case, the highest $2^N$ elements of this space are in A||C, space A is defined to be the highest $10^{16}-2^{53}$ elements of the input string, space C is defined to be the elements of the first number space which are between $2^{53}$ and $10^{16}-2^{53}$, and space B is defined to be the lowest $10^{16}-2^{53}$ elements of the first number space. If the input is deemed to be within the second, binary number space (A||C), it is subject to a bPRP (binary-pseudo-random-permutation) where bits are shuffled according to a first transposition vector, per numeral 527; if the input is within the third, non-binary (or remainder) space B, it is left alone. The result of the pPRP 527 will be a new number resident in space E||D. Space D||B represents a fourth (binary) number space, equal in size to the second number space, while only partially overlapping that space, while space E is a non-binary or remainder "fifth" number space consisting of the highest $10^{16}-2^{53}$ elements after the first round of processing. These number spaces are indicated with reference to numeral 533. If an element is within the fourth number space (this time, the lowest $2^N$ elements) it is subject to another bPRP process 529, using a second transposition vector. This second transposition vector can either be the same transposition vector as previously used or it can be a different one (e.g., produced using an auxiliary key variant), depending on embodiment. If an element is within space E, it is not processed, but is simply passed to the next step. Following this second round of processing, the scrambled input number is now within space E (the fifth number space), space G (the highest $10^{16}-2^{53}$ elements output from the second bPRP process 529), i.e., a seventh number space, or space F (the lowest $2^{53}-2*(10^{16}-2^{53})$ elements from the second bPRP), i.e., a sixth number space. If the result of processing is within space F, then it is linearly mapped as indicated by numeral 536 by adding $10^{16}-2^{53}$ (i.e., a value corresponding to the size of the remainder space) to the result, with the resulting sum shifted as indicated by numeral 539; if the result is within space E||G, the value is then "riffled," e.g., by taking odd values within this space and mapping those odd values to one of space H or I and by taking even values within this space and mapping those even values to the other of space H or I. For example, if the result is an odd value, then $2^{53}-2*(10^{16}-2^{53})+1$ can be subtracted from the result to produce a difference, the difference can be divided by two, and $2^{53}$ can then be added back to this quotient, to yield a value within space H; if the result is an even value, then $2^{53}-2*(10^{16}-2^{53})$ can be subtracted from the result and the difference divided by two to yield a value within space I. Whichever space (H, F or I) contains the end result, this end result represents (at 539) an encrypted version of the original input which can be recovered if the transposition vectors are known. This end result is converted back to the format of the original input, as necessary, such that in this example, it also represents a sixteen digit number (i.e., with $10^{16}$ possible values, and which is also has a position in the first number space), as indicated at 525. This output can receive further optional encryption processing either before or after such conversion.

Note that many other techniques also exist for "riffling" such spaces, and processes for transforming these spaces can optionally be more complex than those described above. For example, returning to the example above, for cases when number space E or number space G is odd sized, (such as for example when the size of the overall number space=$63^{65}$ such that the remainder of $63^{65}-2^{388}$ is an odd number), then a number in one of spaces E or G will have a slightly greater probability than a number in the other one of these spaces of being mapped to space I or H. To address this, another mathematical technique can be applied to vary the way in which spaces E and G are mapped to spaces G and I; for example, yet another transposition vector can be applied to further vary this mapping (e.g., by circularly shifting bits in this space by a variable amount and then applying even/odd processing as described above). Clearly, many variants are possible, and other processes may also be applied.

Figure 5C:
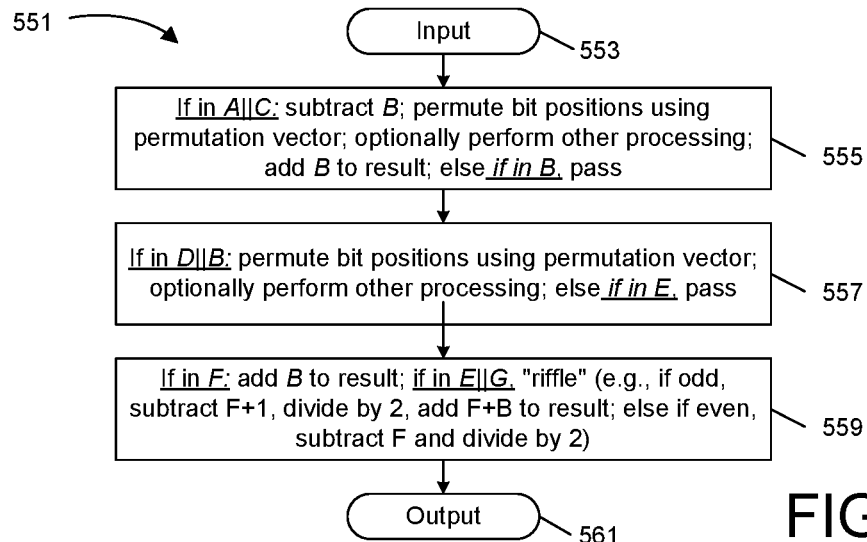
FIG. 5C is a flow diagram used to explain processing utilized in connection with the flow of FIG. 5B.

FIG. 5C is a flow diagram 551 used to explain processes utilized in connection with the flow of FIG. 5B. More specifically, as indicated at 553, an input is received. As discussed above, if the input is in non-binary number space, this space is segregated into binary and non-binary number spaces; the binary space is preferably made as large as possible within the first number space and, for a system with only two permutation rounds, should be at least large enough to ensure that any given value in the first number space is necessary encrypted using a transposition key, given the number of rounds of processing. Thus, in this example, where there is two processing rounds, the binary space should be at least half the size of the first number space. As indicated at 555, if the input is within A||C as previously discussed, the size of non-binary space B is subtracted, and the bit positions of the binary-converted-input is then transposed according to a transposition key. Other encryption processing can also optionally be performed; for example, in one contemplated embodiment, bits of the input, either before or after transposition, can also be the subject of non-linear substitution or bit flipping techniques, which help immunize the process against differential attacks, double-differential attacks, or other forms of statistical attacks. The size of space B is added back again to the result. If the input value is in space B, it is passed to the output of the first round without transposition, all as just described above. Note that this is not required for all embodiments, i.e., it is also possible to subject B to cryptographic processing as desired; that is, any number of optional processes can be performed as long as these can be reversed by decryption software. Per numeral 557, the "intermediate value" resulting from this first round of processing is again sorted into one of two number spaces; this time, space D||B (selected to include any value not transposed in the first round of processing) is selected as a binary space, and is subjected to bit transposition according to at least one transposition vector. Any resulting transposition output represents the input, but in a manner that has been bit-transposed at least once and possibly twice. As noted, if the result is in number space (E), it is then passed without further processing (once again, this is not required for all embodiments and, in an alternative embodiment, space E also receives further encryption/decryption processing). Per numeral 559, the "intermediate value" from this second round of processing is then passed to a third processing round, which includes shifting the value (within the first number space) if in space F, else "riffling" the remaining possible values E||G to either side of the shifted space F (i.e., to space H or I from FIG. 5B). Note that this function represents one possible operation for the third round of processing, and that either fewer rounds or additional rounds can also optionally be performed. Note also that all of the described operations for this embodiment are advantageous in a digital implementation, because they can be implemented primarily in hardware, that is, using shifts, adds, hardware-based lookup functions, XORs, bit inversions and other simple binary logic functions. The end result can be converted back into the original format (e.g., base-10 numbers) and output, as indicated by numeral 561.

Figure 6A:
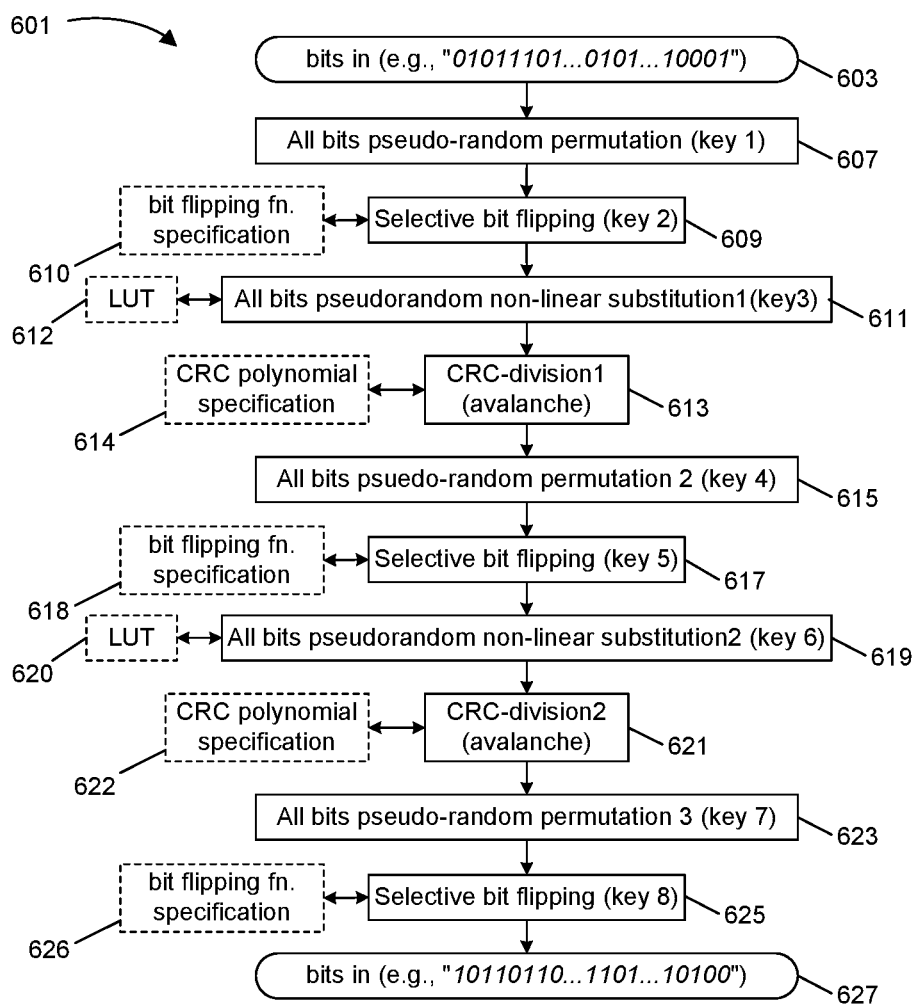
FIG. 6A is a flow diagram showing one embodiment of the pseudorandom random permutation ("bPRP") task illustrated in FIG. 5B.
Figure 6B:
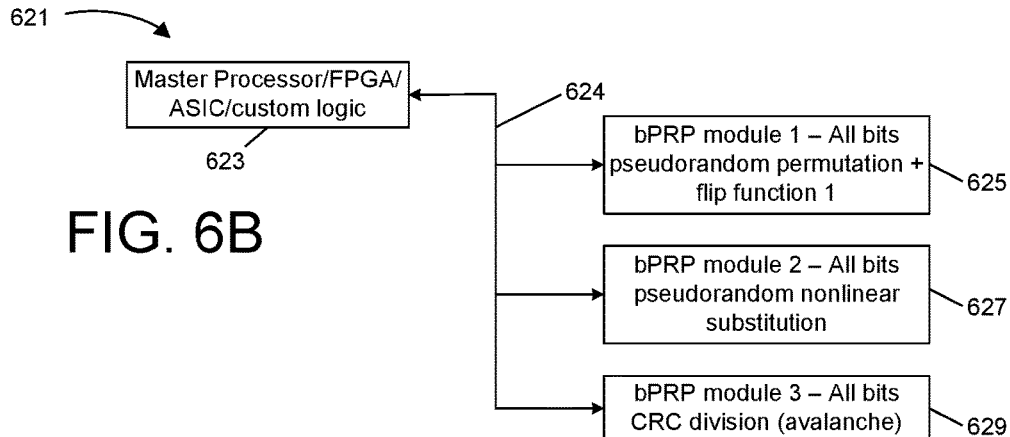
FIG. 6B is an illustrative diagram showing interaction among hardware modules (e.g., application specific circuitry), each of which performs one or more of the processing tasks depicted in FIG. 6A.
Figure 6C:
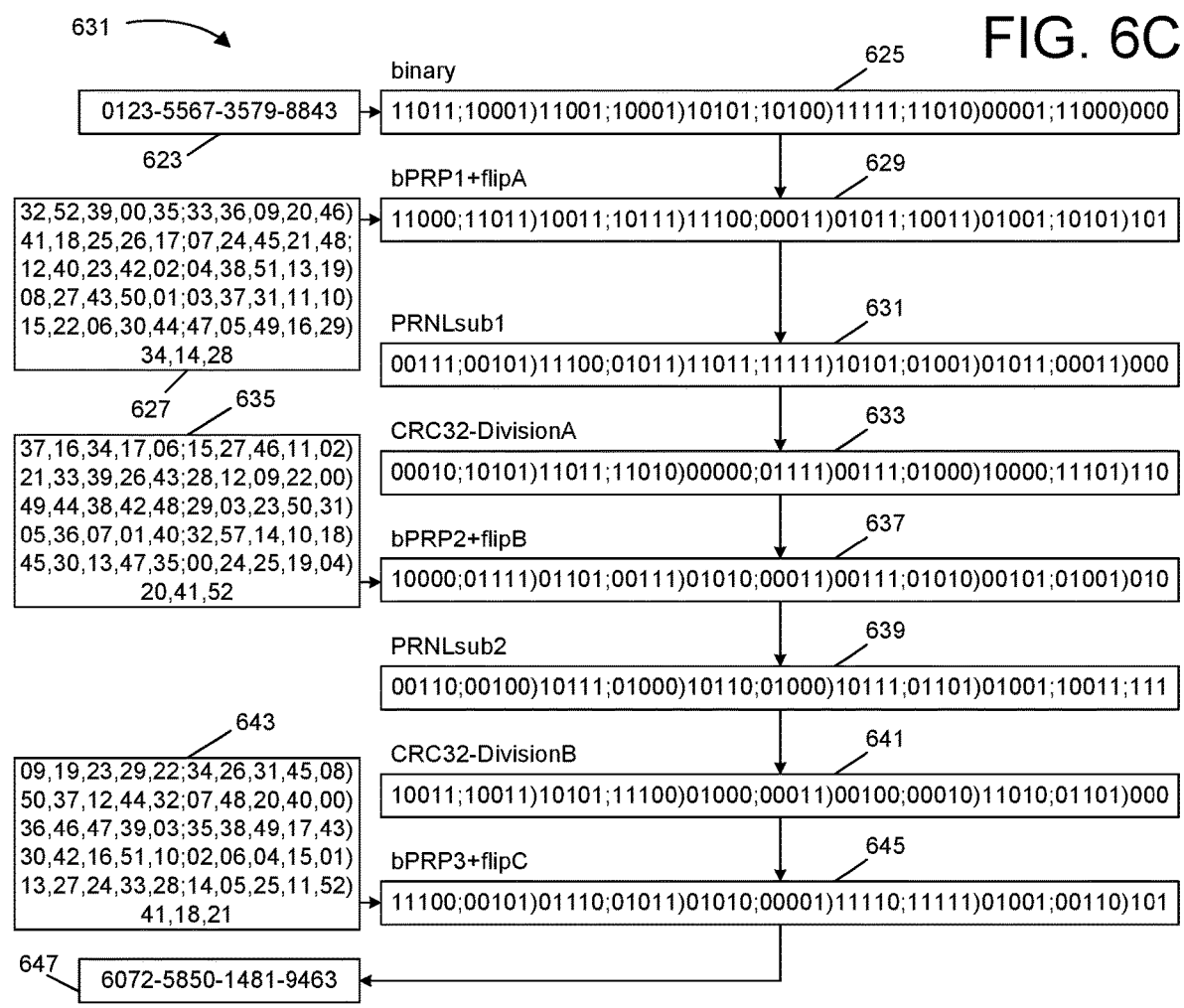
FIG. 6C is an illustrative diagram used to narrate one hypothetical example of processing a token (e.g., a payment credential) using flow introduced by FIG. 6A.

FIGS. 6A-6C are flow diagrams that are used to illustrate the type of cryptographic operations just discussed. As noted earlier, operations such as the ones depicted can be implemented in software (operating on hardware) or predominantly in hardware, the latter being preferred in some embodiments because of the speed advantage.

FIG. 6A is used to discuss "bPRP" processing in one embodiment, for example, as introduced by elements 527 or 529 from FIG. 5A. Flow is generally referenced by numeral 601, and consists in this embodiment generally of five rounds, including three rounds of permutation and selective bit flipping operations, and two rounds of non-linear substitution followed by a CRC division.

More specifically, a series of bits are received, per numeral 603; as implied earlier, this input string can be of arbitrary length, e.g., thousands of bits in length if desired, or shorter or longer. In the depicted example, it is assumed that it is desired to provide an FPE process and that processing is to be applied on a single segment of bits having a length against which the transposition vectors are specifically matched, e.g., 53 bits in this example. This is not required for all embodiments, i.e., as will be exemplified below, the various processes discussed below can be applied to variable length inputs which are segmented in a manner to match length of the transposition vector. In this example, it is assumed that the application is FPE, and that the transposition vector is to be applied to permute a single set of input bits (i.e., a single segment), with this operation being denoted by numeral 607.

Note that it was earlier referenced that for some embodiments, multiple different transposition vectors can be generated and differently employed, depending on embodiment; FIG. 6A indicates that at least eight different such vectors are used in this embodiment, to perform a single bPRP operation. Thus, a first of these vectors ("key 1") is applied in FIG. 6A to permute bits of the input, using wrapping as appropriate. For example, if the input string were 5000 bits in length and the transposition vector represented the permutation of 256 characters, then permutation would be performed for at least 20 different segments; note that the "last" segment would include only the last 134 bits of the original 5000 bit input string. In this regard, these 134 bits would be prepended to 116 "permuted" bits at the beginning of the sequence, with the results of this 20$^{th}$ permutation written back to occupy the last 134 bit positions of the original 5000 bit input string, and to overwrite the already-permuted bit position. Note that additional segments can also be processed, e.g., it is possible to perform this wrapping twice or more, or to perform processing on some other basis, as long as decryption software (or processing logic) possesses sufficient specification so as to reverse the permutation. Per numeral 609, a selective bit flipping function is then performed, according to a desired specification 610, with a second transposition vector ("key 2") being used for this purpose. Once again, it should be recalled that software can advantageously generate a series of related auxiliary keys on a deterministic basis, and that these can be used to compute respective transposition vectors. In this case, however, the resulting vector is not used for permutation but, rather, the ranking values are further processed to determine (in connection with transposition, i.e., for each segment as appropriate) whether the bit being permuted should be flipped in value (i.e., from "1" to "0" or vice-versa). This processing enhances security of the encrypted end-result by providing a stochastic process where a first binary number is transformed on a pseudo-random basis to a second binary number within the same number space, and renders it computationally infeasible for an attacker to attempt to distinguish it from a perfectly random permutation. In this embodiment, to perform selective bit flipping, each ranking value from the pertinent transposition vector is further subjected to modulo 7 processing, and the 7-element-space result is compared to the threshold (e.g., the number 3) to determine whether to flip the corresponding character position (i.e., the corresponding bit); if the result is equal to or lesser than the threshold, then the bit remains unchanged, but if the 7-space element result is greater than the threshold, then the bit is flipped. As should be apparent, this convention is arbitrary and any number of different functions can be used to perform optional bit flipping. Elaborating further, a hypothetical case was presented above of a "sorted" vector of 120:163-124, 2:178-166, 14:331-138, 19:349-41, 11:368-145, 7:687-69, 3:809-249, 4:1362-76, 1:1376-83, 17:1626-131, 13:2051-55, 8:2119-152, 16:2326-48, 6:2435-242, 5:2793-159, 9:3350-235, 18:3405-214, 0:3454-0, 10:3616-62, 15:3774-221 and 12:3962-228). Continuing that hypothetical here and assuming a threshold of "3," the value "163" modulo 7 would yield "2" (no flip), the value 178 modulo 7 would yield "3" (no flip), the value 331 modulo 7 would yield "2" (no flip), the value 349 modulo 7 would yield "6" (flip), and so on. In another embodiment, a modulo of 6 is used to reduce probability bias of flipping versus no-flipping; an even modulo base is potentially advantageous in maintaining equal entropy-distance between any pair of numbers in the binary number space before and after each permutation-flip round. In yet another embodiment, the sort index could instead be used in this manner to determine bit flipping; in another embodiment, such processing could be applied to the sort index from the previous transposition (e.g., key 1), thus reducing the number of keys needed for processing. Clearly there are many possibilities and variants that will readily occur to those of ordinary skill in the art.

Numeral 611 specifies that bits (as permuted and flipped as appropriate) are then subjected to a pseudo-random non-linear substitution using a lookup table (LUT) 612. In this regard, in one embodiment, the LUT 612 is implemented using a 32 k RAM populated using a key expansion technique. For example, assuming a key length of 2 k bytes, a sixteen round key expansion process can be used to expand the key (e.g., using a time stamp as a hashing key) to create 32,768 entries; for example, if a hypothetical time stamp was 2015-07-02-120533235, then hashing keys such as 201507021205333235.1, 201507021205333235.2, . . . , 201507021205333235.16 might be used to create 16 copies of the base 2 k bytes, concatenated into 32 Kbytes. The LUT is populated with these base values prior to encryption/decryption of the input string. Then, during encryption/decryption, a 15-bit segment of sequential bits is used (from function 609) to access this memory and read out the 15-bit value found at the corresponding address for use as a substitution string. In one embodiment (discussed below in reference to FIG. 7B), each 15-bit segment can be exclusive-OR'd (XOR'd) with results of the previous lookup to further enhance complexity of the encryption function. Note also that a wrap process can be applied (as discussed earlier) to ensure that all bits from 609 are processed by at least one lookup substitution. As an example, if the processed data from step 609 has 5000 bit positions, then a 15 bit segment used for the LUT is used in one embodiment in 334+ iterations, with the $334^{th}$ iteration processing the last 5 bits of the 5000 positions and the first 10 bits from the very first iteration (i.e., already substituted); from the 15-bit retrieved value, the first 5 bits take the place of the last 5 bit positions of the 5000 positions, while the last 10 bits overwrite the previously-substituted first 10 bits of the 5000 positions. In this manner, all bit positions are the subject of at least one substitution operation; once again, this is not required for all embodiments, and, additionally, more than one "wrap" process can be performed, for example, overwriting bits once, twice, or a greater number of times according to a predetermined convention.

Per numeral 613, the output following non-linear substitution is then subjected to a CRC division or other process to perform bit diffusion. The output of this step is then further processed using a second iteration of permutation according to a transposition or shuffle vector (615) and selective bit flipping (617, optionally according to a second, potentially different bit flipping specification 618). In turn, another nonlinear substitution is then performed (619) using a LUT (620), and the result of this process is again subjected to another CRC division, according to a selected CRC function and polynomial specification (621/622). Note that in these examples, the same CRC function as used in step 613 can optionally be applied (e.g., the same CRC and CRC polynomial specified by 614), or another CRC or other type of hash function can be applied, as dictated by the particular design. FIG. 6A indicates that multiple, different transposition vectors (e.g., dependent on keys 1-6) are used for each of these processes, but this need not be the case for all embodiments. For example, in a variation, only one transposition vector is used (and applied to all indicated processing steps including LUT population). In another embodiment, a relatively small set of transposition vectors are used, e.g., a single vector for both permutation and bit flipping, for all permutation/bit flipping iterations, and a single (different) vector is used for LUT population, for both rounds of LUT substitution. Many variations are clearly possible. Following step 621, a final iteration of permutation according to a transposition vector is performed (623) and a final iteration of selective bit flipping (625) is performed according to a bit flipping specification (626) and the result is then output as indicated by numeral 627. Once again, while FIG. 6A shows this final iteration as using $7^{th}$ and $8^{th}$ keys for permutation and bit flipping in this last iteration, the transposition vectors used for these operations can be selected to be the same vector or vectors as used in any or all of the earlier processing steps. The output at block 627 represents one completed instance of bPRP processing, such as provided by the output of functional boxes 529 and 531 from FIG. 5B.

FIG. 6B indicates one hardware design 621 rooted in multiple circuits (e.g., discrete circuitry or discrete integrated circuits). FIG. 6B shows four circuit groups 623, 625, 627 and 629, all connected by a high-speed bus 624. These various groups of circuitry can be implemented as application-specific hardware, a field programmable logic array (FPGA) configuration, using multiple processor cores, or in some other manner. Additionally, while this particular FIG. is described as having discrete processing elements, in some embodiments, circuitry can also be shared or overlapped between these steps.

More specifically, FIG. 6B shows a master processor (623) and three different bPRP modules, labeled as module 1 (625), module 2 (627) and module 3 (629). As indicated by the FIG., the first module performs permutation functions and flip functions (e.g., according to one or more provided transposition vectors); thus, advantageously in this design, one or more transposition vectors are written to a register in this hardware module and used to shift input bits back and forth (using a high-speed linear shift register to hold input values and an output shift register to hold permuted values) and to also selectively flip bit values during this shifting process (e.g., using an inverter and multiplexer to select between inverted and non-inverted values during the shifting process). Other designs are also possible as would be well-understood by those of ordinary skill in the art, for example, a flip vector described as a series of bits can be XOR'd with permuted (or non-permuted) values. As implied, a single transposition vector can be optionally used for both processes. In one implementation, the master processor (623) performs all vector computation and then programs module 1 as appropriate by writing values to registers in a manner so as to control the permutation and bit flipping functions, and also exchanges data values between modules as appropriate. Thus, for example, after bit flipping, the master processor (623) can retrieve output values from the first module and write those values to the second module 627 (e.g., which includes an input register, a LUT, and an output register). In this particular embodiment, the LUT would have been pre-populated with values by the master processor (or otherwise configured for variable operation in dependence on the pertinent transposition vector and/or key); the module 627 otherwise includes in this design all necessary hardware to shift 15 bits from the input register, use those bits for lookup, perform addition operations as already described (e.g., "XOR"-ing a previous 15-bit value retrieved from LUT with a succeeding 15-bit input), and overwriting content of the input register with retrieved values (e.g., on a circular basis so as to perform the "wrap" function described earlier, as pertinent to the particular configuration). Once again, the master processor 623 can perform any transfers between modules, including retrieving output values and feeding them to the third bPRP module 629; this third bPRP module includes an input register and various shift registers, XOR logic, clocking functions and an output register, so as to perform CRC division as previously described. Once again, the master processor 623 in this embodiment is controlled by software so as to perform sequencing appropriate to the particular embodiment, e.g., the output of the third module can be provided back to the first module for a second round of permutation and bit flipping, as previously described, or to output data from the bPRP process once processing is complete.

Reflecting on the design just described, a few points should be again noted. First, the depicted design relies heavily on hardware logic to perform shift, XOR and other functions so as to achieve very fast processing; software is used in this particular design to orchestrate sequencing between these modules and to control functions of the supervisory processor, such as transposition vector computation, key processing, and module configuration (e.g., during setup), and to accept inputs and provide output values. Third, while one detailed sequence has been described for processing, many variations will occur to those of ordinary skill in the art, e.g., there could be a single round of processing, or many rounds of processing, and fewer, greater, or different cryptographic functions can be used or substituted for those illustrated. Finally, while this design illustrates use of a supervisory processor, other designs rely entirely on binary logic (e.g., with no use of software), or alternatively, perform processing exclusively using general purpose hardware (e.g., a microprocessor core running suitable software or otherwise suitably configured circuitry). Other variations will occur to those having ordinary skill in the art.

FIG. 6C illustrates a hypothetical operation 631 using one or more of the structures depicted in FIG. 6A or 6B. More specifically, it will be assumed that it is desired to perform a bPRP process (such as per numerals 527 or 529 from FIG. 5B) on a hypothetical 53-bit sequence of "11011; 10001) 11001; 10001) 10101; 10100) 11111; 11010) 00001; 11000) 000" (625, again keeping in step with hypothetical application to a 16-digit credit card number). In this representation, the characters ";" and ")" are used merely to demark every $5^{th}$ bit, as a convenience to the reader. In such an example, it might be assumed that a credit card number of 0123-5567-3579-8843 is received (623), and that this number is first processed to associate it with a binary space and is represented by a binary sequence, such as referenced above (625). Per numeral 627, a shuffle or transposition vector is computed; in the depicted example, it is assumed the transposition vector has 53 entries, such that segment-based processing is unnecessary (or conversely, such that a single segment only is processed). The depicted transposition vector will move bits of sequence 625 to bit positions indicated by "32,52,39,00,35; 33,36,09,20,46) 41,18,25,26,17; 07,24, 45,21,48) 12,40,23,42,02; 04,38,51,13,19) 08,27,43,50,01; 03,37,31,11,10) 15,22,06,30,44; 47,05,49,16,29) 34,14,28" such that (for example), the first bit of sequence 625 (i.e., a "1") will be mapped to the 33d position of an output sequence (629) and, further, selectively flipped according to a bit flipping function as previously described. As depicted by numeral 629, the (hypothetical) output sequence is "11000; 11011) 10011; 10111) 11100; 00011) 01011; 10011) 01001; 10101) 101" and, in this case, the $33^{rd}$ bit of this output sequence is a "0" indicating that this bit from the first position of sequence 625 has indeed been flipped. Per numeral 631, a non-linear substitution is then performed to replace segments of sequence 629 with new 15-bit segments, using wrapping (previously described) and an LUT (previously described) as appropriate to the particular design. The sequence following this first non-linear substitution step is seen to be "00111; 00101) 11100; 01011) 11011; 11111) 10101; 01001) 01011; 00011) 000" (631). Following this non-linear substitution, a CRC32 division is performed on sequence 631 to obtain sequence 633 ("00010; 10101) 11011; 11010) 00000; 01111) 00111; 01000) 10000; 11101) 110"). Note that if the hardware design seen in FIG. 6B is used, that each of these functions can be performed based on transfers between hardware modules. Thus, for example, the mentioned supervisory processor can feed sequence 625 to module 1 (see FIG. 6B), transfer sequence 629 to module 2, transfer sequence 631 to module 3, and transfer sequence 633 back to module 1. A second iteration of permutation then begins as part of the bPRP processing using this sequence as an input. Note that FIG. 6C shows use of a new transposition vector (635), for example, computed in dependence on a new (second) auxiliary key. This vector is depicted to have the values "37,16,34,17,06; 15,27,46,11, 02) 21,33,39,26,43; 28,12,09,22,00) 49,44,38,42,48; 29,03, 23,50,31) 05,36,07,01,40; 32,57,14,10,18) 45,30,13,47,35; 00,24,25,19,04) 20,41,52," indicating for example that the first bit of sequence 633 will now be permuted to the $38^{th}$ bit position, and so forth. The supervisory processor of FIG. 6B (i.e., if such an embodiment is used to support the flow of FIG. 6C) could reprogram or otherwise configure module 1 of that FIG. to use a second transposition vector while the other modules were performing other processing. Clearly, other designs are also possible. The sequence resulting from the second permutation/bit flip operation is seen at 637, and this sequence 637 is then subject to a second non-linear substitution (e.g., by transfer to module 2 from FIG. 5B); the supervisory processor of FIG. 6B (i.e., if such an embodiment is used to support the flow of FIG. 6C) could similarly repopulate the LUT, or otherwise configure module 2 of that FIG. while the other modules are being used, or alternatively, two different LUTs could be initially populated and used as directed by the supervisory processor. Regardless, the results of the second non-linear substitution are shown at 639 as sequence "00110; 00100) 10111; 01000) 10110; 01000) 10111; 01101) 01001; 10011) 111." This sequence is then subjected to a second CRC32 division (division B, with the result indicated at 641) and a third permutation/bit flipping function is performed (i.e., according to optional third transposition vector 643), with the result seen at 645. As desired, the resulting value (645) can then be optionally mapped back to a 16 digit value, such as the token value "6072-5850-1481-9463," seen at 647. Note again that the processing of FIG. 6C represents one round of bPRP processing (e.g., denoted by 527 or 529 from FIG. 5B) such that additional encryption processing still occurs for the associated embodiment, to effective scramble an input string.

Figure 7A:
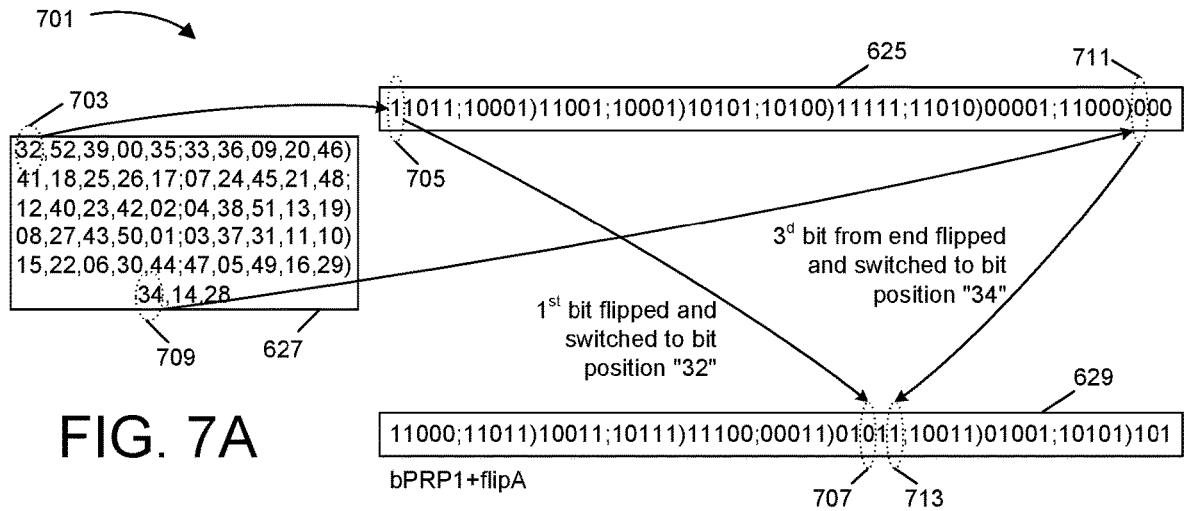
FIG. 7A is an illustrative diagram used to narrate processing performed by a first one of the hardware modules seen in FIG. 6B.
Figure 7B:
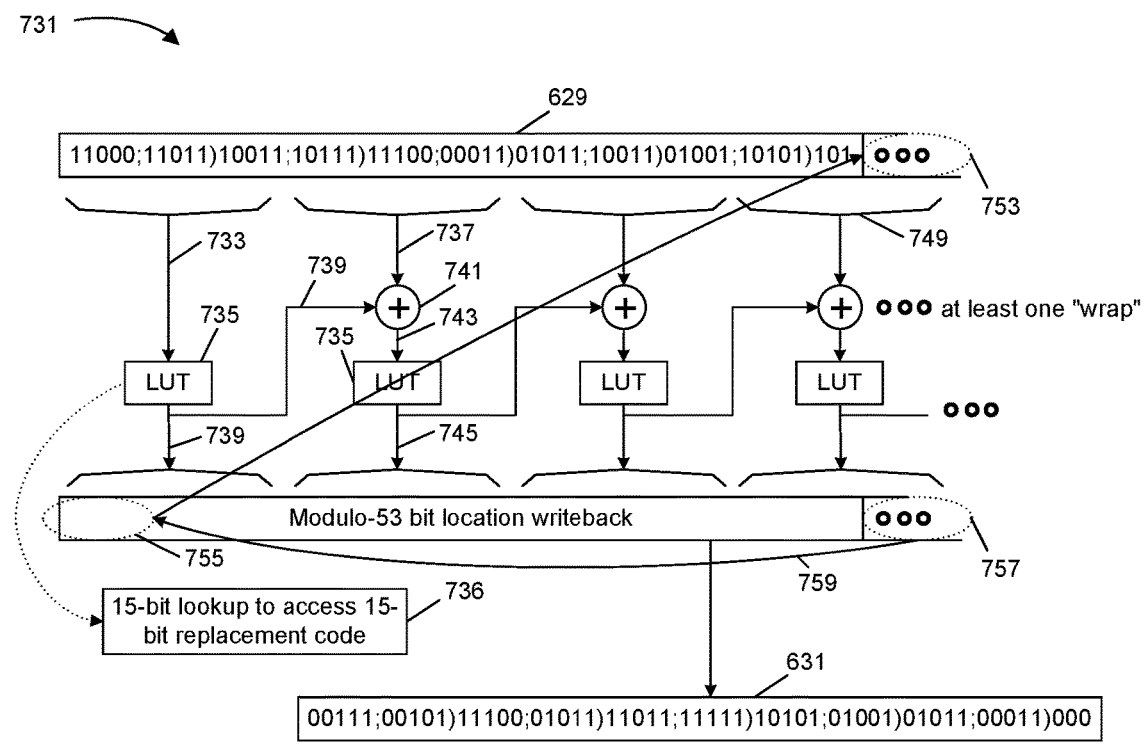
FIG. 7B is an illustrative diagram used to narrate processing performed by a second one of the hardware modules seen in FIG. 6B.
Figure 7C:
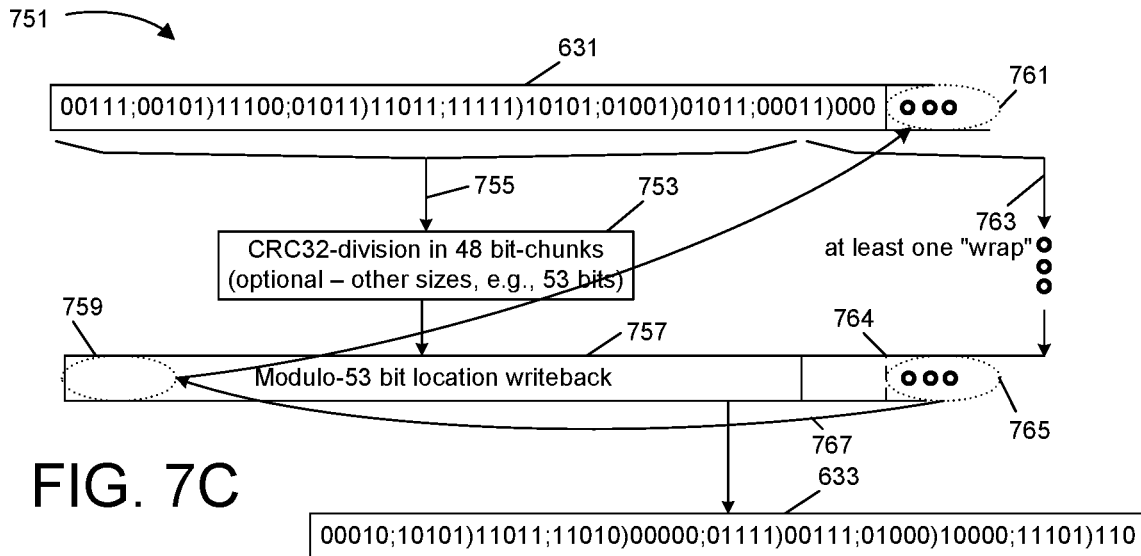
FIG. 7C is an illustrative diagram used to narrate processing performed by a third one of the hardware modules seen in FIG. 6B.

FIGS. 7A-7C are used to provide further illustration of operations performed by the various modules (module 1-3) from FIG. 6B, and associated processing operations. More specifically, FIG. 7A is used to further explain processing performed according to the functions of module 1 (625) from FIG. 6B, FIG. 7B is used to further explain processing performed according to the functions of module 2 (627) from FIG. 6B, and FIG. 7B is used to further explain processing performed according to the functions of module 3 (629) from FIG. 6B.

More specifically, FIG. 7A shows a layout 701 that features the bit sequence 625 from FIG. 6C and the first transposition vector 627 from FIG. 6C. As noted earlier, this vector identifies the value "32" at the first character position (703) indicating that the first value from sequence 625 (identified by numeral 705 in FIG. 7A) is to be moved to the $33^{rd}$ bit position of sequence 629, and flipped. By contrast, the "51" value in the transposition vector 629 identifies the value "34," indicating that the $35^{th}$ value of sequence 625 (i.e., indicated by numeral 711) is to be moved to the $35^{th}$ bit position of sequence 629, and also flipped. As noted earlier in connection with the embodiment of FIG. 6B, various registers, clock circuitry, inverters (or XOR circuitry) and shift operations can be used in one embodiment and, so, transform bit sequence 625 to sequence 629.

FIG. 7B shows a layout 731 that features bit sequence 629 from FIG. 6C as an input and bit sequence 631 from FIG. 6C as an output; depicted processing corresponds to the functions of module 2 from FIG. 6B. More specifically, as indicated by numeral 733, the first 15 bits from sequence 629 are shifted into a register or otherwise output and used as the basis for lookup (736) from a LUT 735. The output from this LUT is both written into an output register (or used to overwrite the input at corresponding bit positions) as indicated by numeral 739 and is also fed to a summing junction 741 to be added to (exclusive OR'd) with a second segment of 15 bits (737). The result of this addition process at 743 is once again provided to LUT 735 and used to output a new 15-bit substitution sequence which is written for use as an output (as indicated by numeral 745) to take the place of the second segment of bits; similarly, this 15-bit output 745 is fed to the next summing junction, and so forth. As indicated by numeral 749, the last 15 bit group relative to the depicted 53-bit input includes the last 8 bits of the 53 bit output, which is prepended to the first 7 bits from 739, i.e., sequence 755 is effectively used as indicated by numeral 753 to "wrap" the retrieved segment of bits in a deterministic manner. As indicated by numerals 757, 759 and 755, the last 7 bits of the resulting LUT lookup then overwrites the first 7 bits (755) in the output register, and so forth, providing a module-53 bit location write back. Such a wrap process can be performed more than once if desired, and once complete, forms the output sequence 631. For example, in one embodiment, the wrap process is optionally performed so as to propagate any change in output bit i to bit position j, where i and j are each indices within [1,53]. Again with reference to the specific hardware embodiment discussed in connection with FIG. 6B, this sequence can then be fed from the "module 2" of that FIG. to "module 3" for the ensuing operation.

FIG. 7C depicts this ensuing operation using numeral 751. More specifically, FIG. 7C reproduces sequences 631 and 633 from FIG. 6C and is used to explain CRC division, for example, as performed by module 3 from FIG. 6B. More specifically, a segment 755 (in this case, a 48-bit segment) is retrieved from the input sequence 631 and is subjected to a CRC32 division (753), with a 48-bit quotient being written to an output register as indicated by 757. A new segment of bits is then taken as indicated at 763, wrapping any appended bits from the start of the register which may have been previously overwritten, as conceptually indicated by numerals 759 and 761. Once again, bits from the ensuing CRC division are then (as appropriate) used to take the place of input bits as necessary, wrapping bits as needed on a circular basis from the start of the output register (position 764), as indicated by numeral 765. Once again, all bits are subject to at least one overwrite from the CRC division process, i.e., such that in this hypothetical (i.e., where 48-bit segments are divided by a 32 bit polynomial), at least three "wrapped" segments are used (assuming a 53 bit input) to span all 53 bits from the input (631) with at least once with the result of CRC division. As noted by box 753, this structure simply represents one example and, indeed, any other segment size for input bits can be used, e.g., 53-bits, 64-bits, etc., and the depicted configuration represents only one possible design.

Note that any of these modules can be applied to key processing, text encryption or other processes. For example, it was previously mentioned that it is desired in some embodiments to perform bit diffusion relative to minor differences in a key (or an input string) to have those minor differences affect many output bits, the so-called "avalanche effect." In one embodiment, the mentioned-wrap process is used to assist with this diffusion, e.g., by wrapping a CRC division two or more times across an input string (e.g., auxiliary key concatenated with a primary key), such processing permits even least significant bit differences in the primary key to have a profound effect on the resulting output. As before, a modulo write back process is used to obtain this result.

Reflecting on the designs discussed above, encryption and decryption can be based on at least one transposition vector, derived from a secret key, and used to switch character positions of an input string. Such encryption and decryption processes have many applications, including to text encryption, token generation, password management, and other applications. FIG. 4 was used to describe one embodiment of generating a transposition vector from a secret key, and FIGS. 5A-6C were used to discuss specific detailed encryption methodologies and possible hardware designs for an application to FPE, that is, where a possibly non-binary input is encrypted (or decrypted) to occupy a different position in a common number space.

Figure 8A:
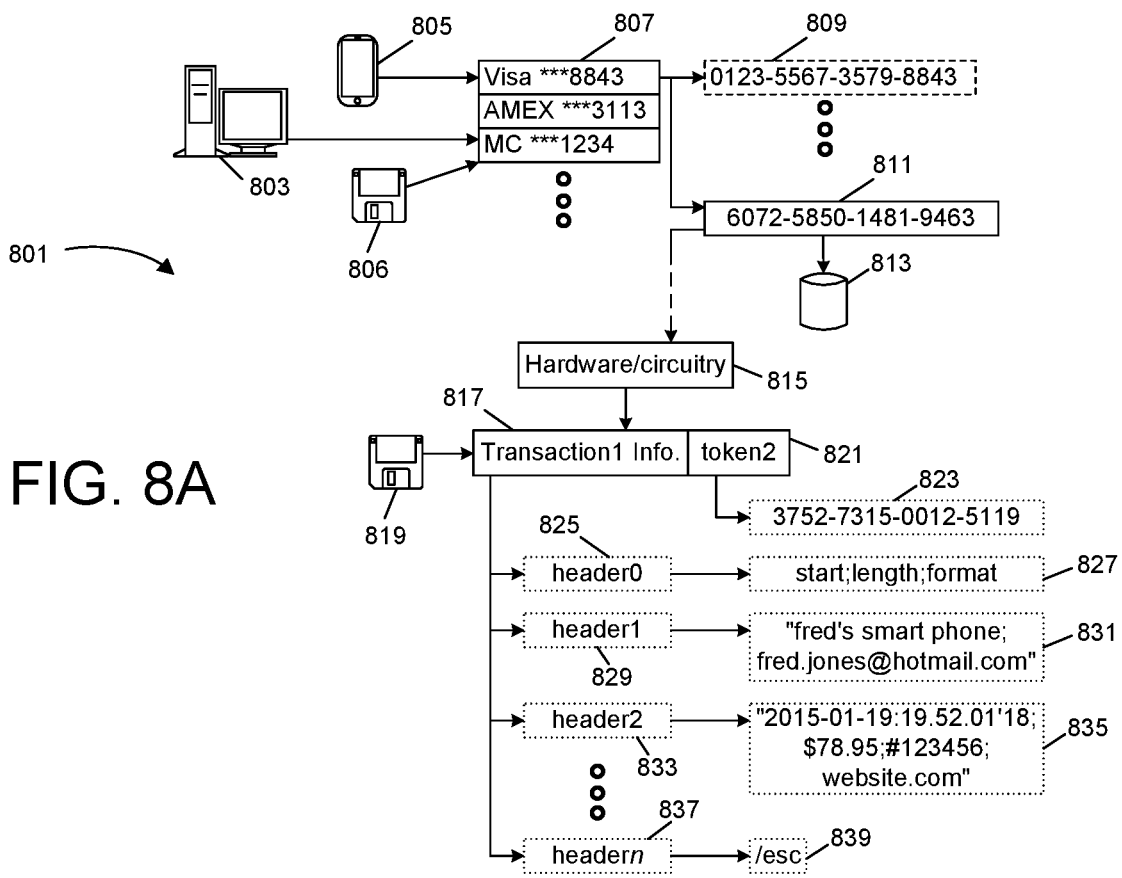
FIG. 8A is an illustrative diagram used to explain applications of processing performed herein to token encryption and exchange using a mobile device (e.g., a smart phone).
Figure 9B:
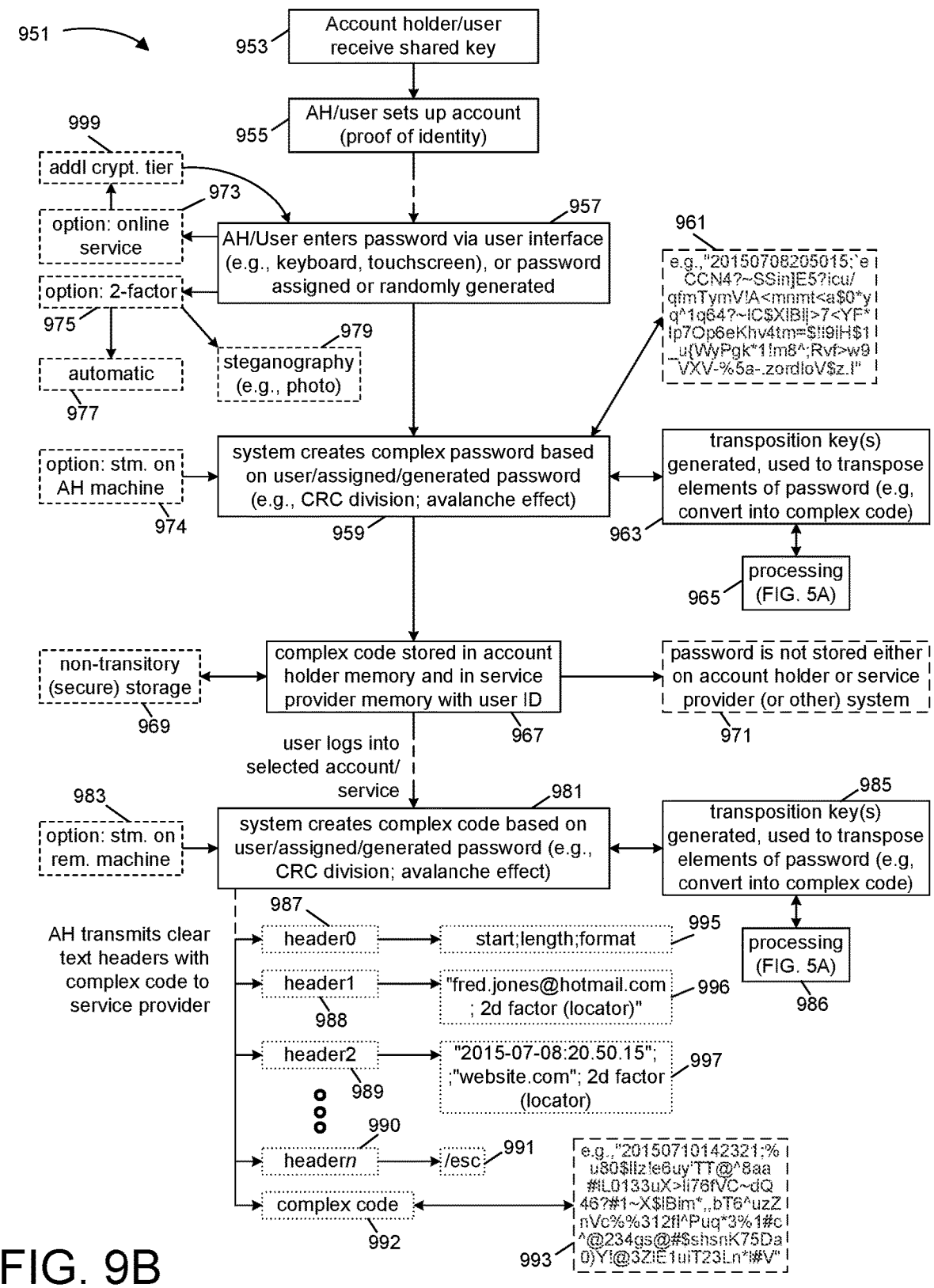
FIG. 9B is a flow diagram that describes functions performed by the password manager introduced in connection with FIG. 9A.

FIGS. 8A-8B will be used to provide further implementation detail on one possible embodiment of the principles adduced above, in particular, regarding instantiation as a software application for effectuating credentials authentication (e.g., installed or downloadable to a computer, smart phone or other digital device) and associated decryption methodology. FIGS. 9A-9B will be used to discuss a password manager embodiment, which similarly can be optionally embodied as a software application downloadable to a computer, smart phone or other digital device. Finally, FIGS. 10A-10B will be used to discuss alternatives for applying this methodology to general text encryption. Any of these functions can be implemented using dedicated (or shared) hardware, not limited to the design depicted in FIGS. 7A-C, and using or a greater or lesser degree of software-based control.

More specifically, FIG. 8A is an illustrative diagram illustrating various components generally referenced by numeral 801. As indicated by numerals 803, 805 and 807, it is desired to store the equivalent of one or more credit card numbers on a digital device such as computer 803 or smart phone 805, but not have those credit card numbers be subject to discovery or theft, either while stored on device 803/805, or as a result of interception of any ensuing communications. To this effect, only an identifier is stored on the digital device 803/805 to identify the particular credit card, for example, "Visa *8843" (i.e., the last four digits of the credit card) as indicated by numeral 807. Preferably, software and/or hardware on the device (represented by floppy disk icon 806) represents multiple such numbers in a manner where an owner of the computer or smart phone (i.e., a "user") can select between different numbers and, in so doing, select a different manner of payment. As represented by numeral 809, the representation "Visa *8843" is a proxy for the true credit card number, which is not in fact stored on the device. What is stored in memory (813) on the device is a token (811) derived from the true credit card number, for example, the number 6072-5850-1481-9463 (811) which is derived from a shared (secret) key of the user, an identity associated with the digital device, potentially other (e.g., auxiliary key) information and the true credit card number. This memory 813 can optionally be a secure hardware storage device or container that does not directly pass access to the token to unauthorized software or processes, e.g., operating outside of a secure container on the digital device.

When it comes time to process a transaction, for example, to electronically communicate payment information to a merchant, this token is retrieved and processed by dedicated hardware 815 on the digital device in order to further tokenize the stored information (811). For example, if it is assumed that the first token, e.g., 6072-5850-1481-9463 (811) is not to be provided outside of the digital device, then hardware/circuitry 815 takes this number and encrypts it using onboard FPE software in the manner previously described. The resulting new token 821 (token 2) can be stored in some form of non-transitory machine-readable media, as denoted by floppy disk icon 819; this token (token 2) could hypothetically take the form 3752-7315-0012-5119 (823), i.e., having the same format as the original credit card number. Note that the new token is also typically associated with transaction information (817), which typically comprises a number of headers, arranged or transmitted in a predetermined format. These headers convey the auxiliary key information, transaction particulars, and other identifiers needed to decrypt or authenticate the new token by one having all the necessary shared keys.

The header format is exemplified as indicated in the lower-half of FIG. 8A. A first header, "header0" (825) identifies header length and format (827) for the encryption process, for example, specifying the type of software or system that has to be used to decrypt the token 823, the number of keys to be used, the type of hash or CRC division, the bit flipping specification, and other encryption variables, all as discussed earlier. For example, "header0" might specify that there are "n" headers ending with a final header, "headern" (837, comprising an escape character, 839), and indicate specifically that the process discussed above in a connection with FIG. 6C was used for encryption. The remaining headers specify the various auxiliary keys and identities that are applied for each FPE process to produce a respective token. For example, a second header, "header 1" (829) might specify the identity (831) used as an auxiliary key in order to generate token 811 (e.g., "fred's smart phone; fred.jones@hotmail.com"); as noted earlier, this header/ identify format is exemplary only, e.g., a time stamp or other form of auxiliary key could also be used. A third header, e.g., "header2" (833) might specify transaction particulars including the auxiliary key used for the second FPE process (e.g., to generate token2, 823, from the token 811 stored on the digital device). For example, as indicated by box 835, this information can convey a time stamp "2015-01-19: 19.52.01'18," a purchase or transaction amount (e.g., $78.95US), a merchant reference number (e.g., #123456) and a merchant ID (e.g., website.com). Some indicator or field is preferably used to specify the precise auxiliary key used to generate the second token, token-2 (823). The various header information collectively is sufficient to provide any references deemed necessary to the transaction (e.g., purchase amount and merchant reference), and for a source entity (not depicted in FIG. 8A) to identify the user ID (i.e., so as to permit the source entity to identify the original credit card number, and each shared key used in any round of tokenization, and indicate the associated auxiliary keys). As mentioned previously, in such a configuration and application, the shared keys and credit card numbers are typically not shared by the source entity, which uses this information simply for transaction approval and confirmation (e.g., by message to a merchant). As indicated by the presence of ellipses at the bottom of FIG. 8A, any number of headers can be included, sufficient to indicate each tokenization performed relative to the original credit card number.

FIG. 8B shows flow 851 from the perspective of one seeking to decrypt a provided token. For example, such techniques could be implemented by (assuming a payment processing scenario) a source entity, such as referenced earlier. Numeral 853 denotes a non-transitory computer-readable storage medium, for example, kept by a merchant or other entity, and numeral 855 denotes one entry or line item consisting of transaction information (i.e., a string of headers as discussed earlier) and a token ("token-2"), collectively represented by numeral 855. The token in this example can be assumed to be 3752-7315-0012-5119 (as seen at 823). When it is desired to verify the presented token, information 855 is transmitted to the source entity, as indicated by numeral 857, and is received by a modem or is otherwise stored, as indicated by numerals 859 and 861. The source entity can then perform an inverse encryption/tokenization 863, for example, applying the techniques of FIG. 5A/5B/6C but in reverse order. For example, the source entity first applies the transaction headers 865 referenced earlier (i.e., see numeral 835 from FIG. 8A), and uses the user's secret (shared) key to compute inverse transposition vectors for the second FPE round, to recover token 6072-5850-1481-9463 (811) from token-2. It then uses other headers (869) to recover the original credit card number (e.g., at 809 0123-5567-3579-8843) from the first token, as indicated by numerals 869, 871 and 873. For example, per numeral 303, the source entity can use its master key and header information which identifies the underlying key to recover the original credit card number. The source entity can then match this credit card number to access its database (877) to verify credit card status (875), and can then perform optional payment processing (879) as appropriate.

Note that alternatively, the source entity can also employ exactly the same encryption processes as represented by FIGS. 5A-6C. For example, assuming a unique user ID, the source entity can use this information to access the user's credit card number, and can then also take the provided headers (i.e., auxiliary keys), its master key and the user's shared (secret) key and create duplicate transposition vectors and LUT values, so as to use FPE to tokenize the retrieved credit card value in two iterations in the exact same manner as the user. If this process generates a duplicate of the provided token (e.g., 0123-5567-3579-8843), then the user is authenticated, and payment processing or other action can once again be applied.

As noted earlier, the encryption/decryption techniques provided herein have many permutations and applications, not limited to FPE. FIGS. 9A-9B are used to provide an example of a password manager application, for example, once again stored on a user's digital device (such as a computer or smart phone). FIGS. 9A-9B illustrate two techniques that are optional to one another, including the use of a password manager to perform number space expansion (e.g., so as to create a complex password dependent on a user-supplied, relatively simple password), and to perform encryption of a password (either a user-supplied password, or a more complex password, depending on embodiment). Passwords can be any length, and can also be generated arbitrarily. For example, the password manager can be applied to optionally receive a user choice of password, which is then not permanently stored on the digital device, but rather is subjected to number space expansion and is encrypted and used to create a much more complex password that the user does not have to personally remember; alternatively, a password can be "assigned" by a login site or generated in another manner. Whichever methodology is used for password generation, during login or other credentials provision, the encryption techniques of this disclosure can then optionally be applied to encrypt the password for communication with the selected site or service; the communicated, encrypted information is then decrypted, and used to authenticate the user at the recipient location.

FIG. 9A provides an illustrative diagram of a password manager application 901. As depicted by numerals 903 and 905, such an application can take the form of instructions stored on non-transitory computer-readable media that, when executed by a processor, create a secure vault for storing pre-defined passwords. The screenshot depicted at 905 requires a user to enter a master password or otherwise launch the password manager application, which leads the user to a visual display (907) of stored passwords. As depicted, the password manager stores a plurality of passwords, indexed by service provider and/or website. For example, FIG. 9A shows stored entries for hypothetical providers of "acme.com," "yeehaa.com," "kiwi.com," "juggle.com" and "supersoft.com." Each entry is seen to include a user ID (i.e., a login credential), a time stamp (e.g., generated at the time of password definition), a second factor ID designator ("secfac") and a credential or password, consisting of a long, complex code. Note that greater or fewer fields can be present, or that additional information (e.g., web site address) can be stored, and that FIG. 9A represents merely one possible embodiment. To provide a hypothetical example illustrating operation of the depicted password manager, when the user seeks to enroll a new credential (for example, a login for a new cloud service), the user is called upon to enter a new password, for example, via a browser program. An extension to the browser program is coded to recognize that a password is being requested, and provides the user with an option to launch the password manager program. If this option is accepted, the password manager asks the user to define a password, for example, "Open Sesame!" The password manager expands this password as necessary (e.g., using leading spaces or other form of padding), obtains a time stamp, and uses a secret key and the encryption/transposition processes described above to create a more complex password (the complex code) based on the user-defined password. The use of padding and/or number space expansion will be further discussed below. In addition, other information can also be used as part of or in addition to any user-supplied password, for example, a second factor comprising the password required for the password manager, a location of a specific file on the digital device, another key of some type, a photo, or nearly any other desired information. Once each of the information fields is populated (including as an option, password recovery information), the password manager creates the complex code based on the user-supplied values, e.g., Note that various alternatives exist. As an example, in one embodiment, the user's original password is not provided to the login service, but rather is only used to generate a complex code (e.g., through number space expansion). This complex code is then provided to the login service as the user's true password, and the user-supplied value is used only for generation of this complex code. An advantage of such a process is that the login service can have stringent password requirements (e.g., 15+ characters or longer, use of 4 or more character types), that the user can use a password they can easily remember (e.g., "Open Sesame!"). When the password is initially enrolled, in a manner transparent to the user, the password manager software transforms the user-supplied password into a far more complex password (the complex code) which meets any specified login requirements. In one contemplated embodiment, the user-supplied password is treated is a little endian preamble of a much larger number space where unseen characters (i.e., "padding") are inserted as the equivalent of "zeros" or "escape characters" according to a convention defined by software; some or all of the encryption techniques discussed above are then applied to this space in order to generate the complex code (i.e., a string having many characters, where it is difficult to recover the original password from the string, and where a second factor is optionally applied according to a convention of the software, so as to make it difficult to derive the complex code without possession of the second factor). In other embodiments, padding can take the form of padding specified according to the "PKCS5" standard, or one of its variants; a variable length printable ASCII string or a variable and indefinite-length binary string can also be used.

"'eCCN4?~SSin]E5?icu/qfmTym/V!A<mnmt<a$\0*yq^1q64?~IC$XIBI|>7<YF*Ip/7Op6eKhv4tm=$!I9iH$1__u{WyPgk*1!m8^;Rvf>w9VXV-%5a-.zordIoV$z.I"

from "Open Sesame!" and the other pertinent inputs. This code is then stored on the user's digital device and is used for password entry into the pertinent service; at the same time, the user-provided password is optionally discarded and is optionally not stored on the user's digital device. Note that the pertinent service receives the user's original password (e.g., "Open Sesame!") and decrypts the code created by the password manager, at time of login or other credentials presentation, to recover the user's original password (e.g., "Open Sesame!"), and effect authentication. In the example presented above, the header of the value Whether or not number space expansion is applied to create a much more complex value for use as a password, in one embodiment, transposition-based encryption is then further applied to further encrypt information to be used as a password for a particular site, and then this information is then what is used for dynamic login. For example, the techniques described above can be applied to a user-login password, to use an auxiliary key comprising a time stamp or other information to vary stored or transmitted password information from login-to-login, in effect, tokenizing the password differently for each login attempt. Note that in "'eCCN4?~SSin]E5?icu/qfmTym/V!A<mnmt<a$\0*yq^1q64?~IC$XIBI|>7<YF*Ip/7Op6eKhvv4tm=$!I9iH$1__u{WyPgk*1!m8^;Rvf>w9VXV-%5a-.zordIoV$z.I"

(i.e., "'eCCN4?'" or another escape character or header value) can be used to denote that the password is generated by the mentioned password manager and that pertinent software should be invoked in order to provide decryption. Note also that as alternatives, password decryption and verification can be also performed as a third party service (e.g., which then transmits the requested password to the login site) and/or the provided code can be subject to further encryption (e.g., using another encryption process based on the use of a transposition vector). Again, once this password is generated, the original user-supplied password is optionally discarded (e.g., it is not permanently stored on the user's device).

such an embodiment, the original user password becomes in a sense arbitrary, e.g., it is not used other than for generation of the complex code or other information transmitted as part of the login (or file decryption) process. Thus, in one embodiment, the user-supplied password can be replaced by a random code assigned by a service provider, which is accepted by the password manager and is simply encrypted when it comes time for later-login (e.g., once again, using one or more auxiliary keys to perform this encryption). In such embodiments, the recipient site is sent (1) transaction information, consisting of headers necessary to determine the auxiliary keys used for encryption, and (2) the complex code that is to be decrypted at the receiving end. As with the examples before, the party performing decryption (e.g., in the event of encrypted communications) has a copy of a shared (secret) key used for purposes of encryption, and any additional shared (secret) key, for example, used for further encryption or for forwarding.

FIG. 9B provides additional detail regarding a password manager embodiment 951. More specifically, per numeral 953, an account holder (AH) or user as part of an offline process receives a shared (secret) key for use in performing encryption operations. Alternatively, the account holder or user generates a shared (secret) key and sends that key to the service provider (e.g., using a mutual key-exchange session such as pursuant to a Diffie-Hellman protocol). The user also sets up an account with the service provider, for example, user name, password recovery information, account particulars, and other information required by the service provider, as indicated at 955. Generally speaking, the user employs a user interface for each process, for example, a touchscreen, a visual display, a keyboard, a mouse, microphone (e.g. voice command) other form of user interface to provide this type of data entry, and is provided with visual feedback via a display screen of the digital device.

With the password manager software activated, the user then enters a desired password, as indicated by numeral 957. As indicated, in other embodiments, the password can be an assigned password from the service provider or can be randomly generated (e.g., by the password manager). The system then uses this password as an encryption operand, for example, performing bit diffusion character transposition and other processes (963) based on the shared (secret) key and any auxiliary key or operands used as a part thereof, using the processes specified for FIGS. 5A-6C (965). For example, a time stamp can be concatenated with the password manager's launch password; alternatively, a PIN or other $2^{nd}$ authentication factor can be used. Similarly, some designs might rely on an automatically-selected hardware characteristic of the digital device, or presence of a specified file in memory, or require specification of a predetermined photo or file address (e.g., steganography), or some other data (e.g., per numerals 975, 977 and 979). In one embodiment, as mentioned previously, a time stamp is concatenated or otherwise combined with auxiliary key information, and the system software, and the password manager software then extends the auxiliary key as necessary to generate a series of related keys. The result of processing (959) is a relatively long, complex code, such as indicated at 961, and a series of headers that will be transmitted to any desired recipient so as to convey the auxiliary key information. Note two primary options are that the password generation (and password manager) are provided as an on-line service 973, e.g., using secure browser technology with the user entering logon information and having the service generate the complex code or password (and then interacting with the desired login site or service), or having this processing performed by the digital device itself (974), for example, as processing performed by software bundled with, or adapted for download to, the digital device.

As indicated at numeral 967, the complex code is stored in memory on the digital device (e.g., in secure memory 969) as one of a set of login records used to access different services or sites, for example, as indicated by FIG. 9A. As noted again by numeral 971, the original password entered by the user is advantageously not stored on the digital device; when coupled with security such as required use of a password to enter the password manager, this process renders the new password resistant to discovery or interception, even in the event that the digital device is misplaced or stolen.

At the time of desired login or service access, the user employs his or her web browser (or an application-specific service) to log into the desired site or system, per numeral 981. At this time, a password manager plug-in detects that the site or service being accessed is a "known site" and either automatically submits the required login or password information, or does so based on user command or response to a prompt. Note that if the password manager is embodied as an online service, as introduced above, that the user might first access the online service and direct that it log into the desired website, e.g., per numeral 983. Irrespective, the system optionally then creates a new complex code per process 981, again using one or more transposition keys as part of an encryption process as described previously (985). This is to say, in this embodiment, the password manager optionally re-tokenizes the information stored on the user device so as to render it impossible to use any intercepted password. To provide an example of such an operation, the password manager software (and recipient software) can be configured to add a count value (or time value that increases with each login) to each login attempt, such that one login attempt relies on a first auxiliary key (e.g., "login1") and a second login attempt relies on a second auxiliary key (e.g., "login2"). In this manner, interception of the tokenized password is rendered unusable to a hacker, as the hacker cannot generate the appropriate token for future login attempts without the user's shared (secret) key (i.e., without the primary key). The recipient simply, in addition to storing the shared (secret) key also stores the appropriate count value so as to have information necessary to generate the appropriate auxiliary key(s). Many variants of this process are possible. Once again, the processes described above, for example, in connection with FIG. 5A (or any other FIG., per numeral 986) may be employed to encrypt or tokenize password or code 961. The software then transmits (992) the pertinent complex code (993) from secure memory, together with appropriate headers, e.g., clear text headers as indicated by numerals 987-990, again followed by an escape character 991. As discussed previously, this header information typically includes any pertinent headers necessary to authenticate the transmitted complex code, for example, conveying password manager software identity, header start, length and encryption format (995), user ID (996) and a time stamp and other pertinent information (997). The recipient receives such information, communicates with a source entity (e.g., that sponsors the password manager software, or otherwise has a copy of the user's shared, secret key), to authenticate the user's identity and to provide access to the desired service or software.

Note that the password manager just described supports a number of use models. First, as already mentioned, the password manager can optionally be designed to support password generation, and/or to be a hosted service. In addition, even if embodied as a hosted service, the software/service can still be designed such that a provider of the service has no access to the user's login credentials. For example, if the service provider or website desires to have control over the site entry and password revocation, it is possible once again to have multiple tiers of encryption. That is, as indicated by numeral 999, the pertinent website or service can use its own shared (secret) key to encrypt a password obtained or provided by an online service. In this regard, as part of the setup process, the user enters password information into the online service, which encrypts password information as described above and transmits a complex code to the desired service or website, essentially as a first token, and the service or website then uses its own key (e.g., a secret, unshared key) to further encrypt this first token to form a second token. The second token is a complex code that will act as the actual password, and this is then transmitted directly to the user, such that the provider of the password generation software does not have access to the password used to access the desired service or site, even though access is based on the code generated by the service provider, i.e., because that code is further encrypted by the website or online service provider that directly interacts with the user, and because the ultimate login credentials (e.g., 981) would have been generated using two keys, i.e., first the user's shared (secret) key, and second, the website's or service provider's shared secret key. Note again that in the embodiment of FIG. 9B, the use of FPE is optional, but is not required. Such a two-tier credential system can be implemented across a multitude of service providers, thereby facilitating a global sign-on service, i.e., where a service provides or facilitates identities that can be used across multiple service providers. Many other permutations and combinations of the above teachings will occur to those skilled in the art.

Figure 10A:
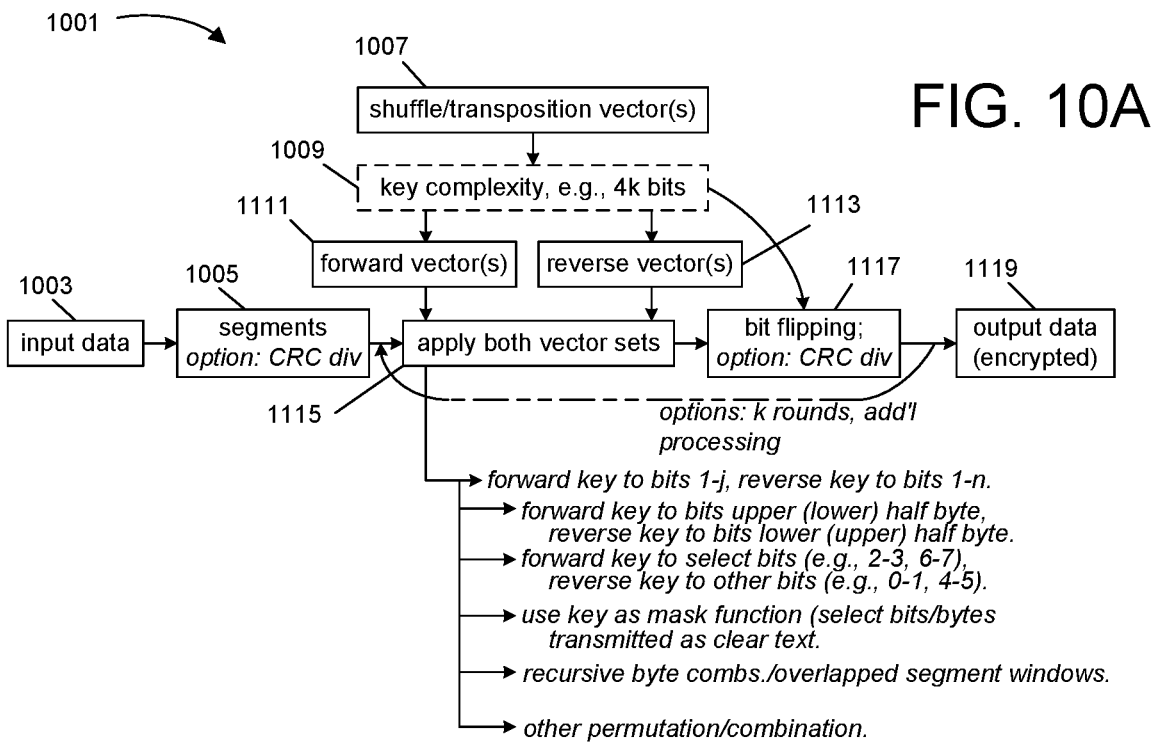
FIG. 10A is a flow diagram used to discuss techniques for encryption of a variable length data string, based on principles introduced herein.

FIG. 10A provides a flow diagram 1001 showing one method of encryption that applies the techniques referenced above. More specifically, FIG. 10A shows a technique useful for encrypting variable-length input strings. An input string 1003 is received, is converted to ASCII (i.e., if in text format) and is segmented (1005) in a manner selected to match transposition vector length, for example, into 53 byte segments. As noted by numeral 1005, a bit diffusion process (such as a 32-bit CRC division) can be used either prior to or after this segmentation process. One or more transposition vectors 1007 are used for encryption purposes. As has previously been described, in one embodiment, very long keys generated and used for transposition vector derivation, as indicated by numeral 1009. In this regard, the depicted methodology uses both "forward" vectors 1111 and "reverse" vectors 1113 (obtained, for example, by reversing the character order of the primary key when computing a transposition vector but still using the same auxiliary key). Once again, the methods described above, including without limitation, with respect to FIGS. 5A-6C, can be used to generate these vectors. Both vector sets are then applied in a specified manner, known a priori to software. For example, in one contemplated embodiment, transposition in this embodiment is applied on a byte-wise basis instead of on a bit-wise basis; that is, the forward vector is used to shift the lower half-byte of each byte (e.g., in the 53-byte segment) and the reverse vector is used to shift the upper half-byte, per numeral 1015. As should be apparent, this differential shifting of parts of each byte into different byte positions according to different transposition vectors effectively scrambles data and improves resilience to statistical attacks. Many different alternatives will readily occur to those of ordinary skill in the art, as depicted at the bottom of the FIG. For example, instead of operating on half-bytes, transposition vectors can operate on respective bits (e.g., the first bit of each byte of a segment is transposed according to a first transposition vector, the second bit of each byte of a segment is transposed according to a second transposition vector, and so forth). Alternatively, groups of bits (e.g., the $1^{st}$ and $3^{rd}$ bits of each byte can be processed using one vector, while a different bit set can be processed using another. A transposition vector can also be used to selectively mask encryption (e.g., such that unencypted original values are conveyed as part of exchanged data, or to perform bit flipping or for byte modification, or some other operation). Recursive operations can also be performed, where, for example, every byte (other than the first) is XOR'd with the byte before it, e.g., prior to transposition. Many alternatives are possible. It is also possible to perform other rounds of transposition and also apply other processing, as indicated in the FIG. Finally, as indicated at 1117, selective bit flipping is performed (as discussed above) with another optional CRC32 division, prior to outputting encrypted data, at 1119. Note that in one embodiment, as previously referenced, the encryption process can be varied from segment-to-segment, for example, in dependence on yet another transposition vector (or other information).

Figure 10B:
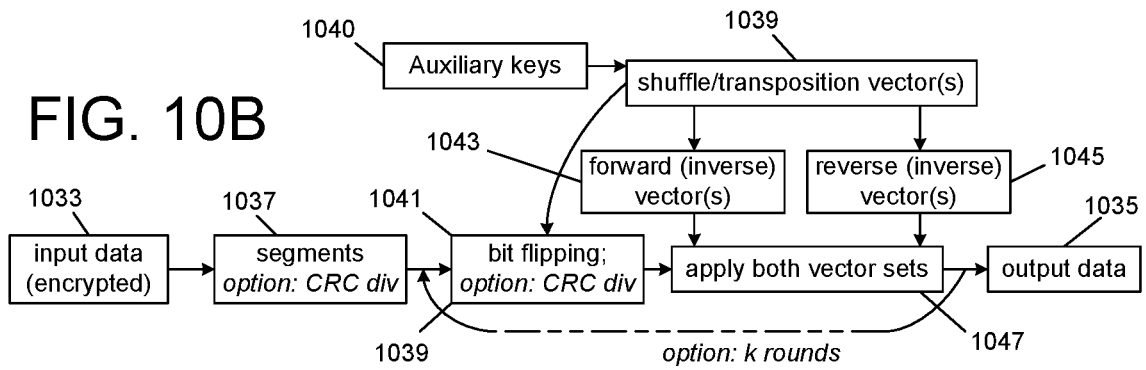
FIG. 10B is a flow diagram used to discuss techniques for decryption of a variable length data string, based on principles introduced herein.

FIG. 10B shows decryption (1031) of encrypted data for example, data 1119 from FIG. 10A. More particularly, encrypted input data is received at 1033 and is segmented (1037) in the same manner as referenced above, and auxiliary keys are received (1040 e.g., via headers) and used to generate transposition vectors (1039) which are inverse to those discussed above. As noted earlier, the inverse vectors effectively map characters back to their true positions (i.e., to "un-transpose" those characters); the inverse vectors are not to be confused with the "reverse" vectors, which are simply generated using a reversed version of the primary key. At this point, decryption processes are performed in the inverse manner to relative to the method just discussed; for example, bit flipping and optional CRC division are performed first (1041) followed by application of forward and reverse inverse transposition vectors (1043/1045), i.e., at 1047. If k rounds of transposition were used for encryption (i.e., whether using the same or different transposition vectors), then k rounds of transposition are used for decryption (e.g., using the same or different inverse keys). Finally, after application of the appropriate rounds, the segments are output in sequence to provide unencrypted output data 1035 (i.e., which matches the input data 1003 from FIG. 10A).

Figure 10C:
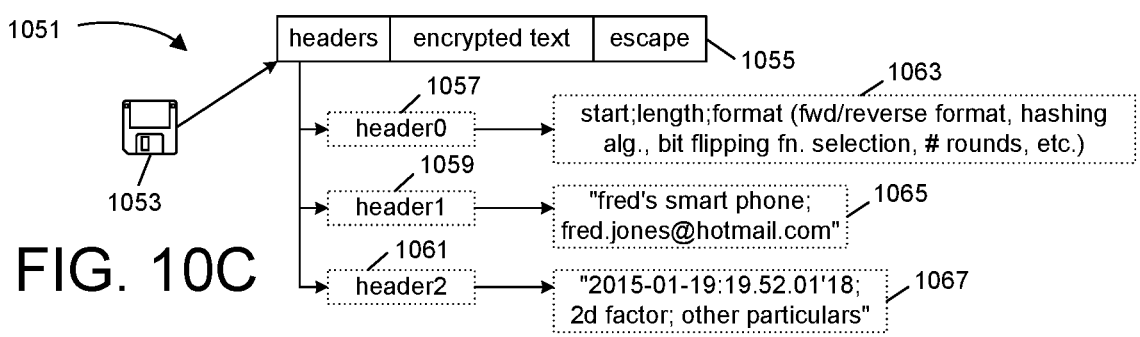
FIG. 10C is an illustrative diagram used to discuss a format for exchanging encrypted data.

FIG. 10C provides an illustrative layout 1051 of a data format for encrypted data. As referenced by floppy disk icon 1053, such a data format can be embodied as instructions (or data) stored on non-transitory computer-readable media. The format is seen at 1055 to include a number of headers, encrypted text (e.g., of arbitrary length and an arbitrary number of segments), followed by an escape character to indicate segment end. This format can be packetized for transmission over a WAN (e.g., using TCP or other protocol), or organized in some other manner. The parameters for encryption are conveyed by a number of headers 1057, 1059, 1061, for example, as described earlier. That is, for example, a first header "header0" (1057) can convey encryption parameters (1063) used by one seeking to decrypt the encrypted text to select the correct software and set up any pertinent hardware or processes (e.g., select the proper secret key, populate a LUT in the proper manner, employ the correct number of rounds of transposition the correct CRC division process or its inverse, etc.; a second header "header1" (1059) can convey user identity (1065), used for example to identify the proper secret key which was used to generate transposition vectors, and other forms of user identity; a third or additional header "header2" (1061) can convey a time stamp, second factor identification, and other parameters (1067) used to identify any auxiliary key used for any given round of encryption, with the headers collectively conveying this information for all rounds of encryption. When received by an entity possessing the proper software and key access (for example, the user in case of encryption of a stored file, or a recipient in case of transmission of an encrypted file), this information permits derivation of inverse vectors, CRC divisors, and LUTs and other encryption parameters, and the inverse of these things, enabling complete decryption of the encrypted text. Decrypted segments are simply appended to one another to create and output string.

Having described a basic encryption protocol for a variable length string, these techniques will now be once again revisited. In one example, these techniques can be applied to provide for an identity avatar system, where identity avatars are exchanged in the clear, and where these avatars are used to authenticate sensitive data such as a credit card numbers (CCNs) or social security numbers (SSNs). In this example, the term "avatar" denotes an ephemeral and verifiably shielded public representation of an identity that only the legitimate owner of the identity can generate. For example, a hypothetical user "Bob Simmons" can set up a shared credential (shared secret keys) between himself and the social security administration pertaining to his SSN ownership. Such a credential includes a public TAG name, for example, "BOBTHEBRAVE108," which is used by the user "Bob Simmons" when that user wants to effectively present his SSN without transmitting the SSN in the clear. In this example, the user's digital device (e.g., smart phone) creates two text strings, such as "BOBTHEBRAVE108; 20150806184715" (user ID and time stamp) and "w7RpyPrfGw0CHyqHtu9vlXygl6QmpbWQofr JX2C5AUXL6aGrfslgemsKSsfzFhFA2", which are supplied by the user in lieu of the SSN. This text is a specific exemplary embodiment of an encrypted text format, where headers convey the public TAG name and a current fresh time stamp, and where the encrypted data is presented as a sixty-five character alphanumeric string following the header. The service provider (e.g., a web page host) accepts such an avatar in lieu of SSN and checks that the timestamp header to verify that the timestamp is fresh (i.e., within a threshold of real time) and sends an online query to the social security administration (e.g., SSA.gov) which passes this avatar. The purpose of this query is to confirm by the authority of SSA.gov authenticity of the avatar. In the current example, SSA.gov will respond to the query and indicate that YES this is indeed a valid avatar without revealing the real name or SSN of the user. The service provider can thusly proceed to an account set-up process using the avatar. For a service provider such as a credit bureau that needs the user's SSN to process a credit check or credit rating, such credit bureau can get a special qualification from SSA.gov as worthy of learning the SSN of the user, which SSA.gov can securely provide as part of the response when the qualifications are in place. For cases where a number (e.g., SSN) is part of a paper form, the avatar can be embedded in a quick response (QR) code that is to be printed on a label and attached (or glued) to the form. Note that in this example, the public TAG name ("BOBTHEBRAVE108") does not need to be unique among all identity holders, even though the system can easily make it unique while negotiating a public TAG name with the user. Also note that in this example, the public TAG name is not treated as secret and, therefore, it could be related to the user's full legal name.

In another example, these techniques are applied to a request-response communication exchange using an HTTP transport mechanism. Once again, headers are generated including a TAG and a fresh timestamp, where the TAG can be a fixed single tag or one out of a few random tags in a TAG pool agreed upon during the key-exchange or set-up phase. The TAG pool can be optionally updated periodically or on demand, for example, as added deterrent to potential adversaries monitoring network traffic. The tags in the TAG pool can be made up of random numbers that are not in any way related to the real identity names. Note once again that these tags in a TAG pool do not necessarily need to be unique. The encrypted data section of the request format contains encrypted payload of a command and data, optionally formatted as a variable length data stream. Additionally, it contains a MAC (Message Authentication Code), which is driven by an authentication key set up during the key-exchange phase of the protocol, with the MAC providing for full authentication of the combined message data including the TAG, the timestamp, the payload command and payload data, inclusive of the streaming data. The response format (for example, produced by the httplistener in HTTP as a response to the request) is similar to the request format, with the principal exception that the TAG can be omitted (as the specific identity of the user is already known). Note that this format can be readily generated by the transposition-based encryption techniques, as discussed above, or conventional encryption methods such as SHA2 and AES. One key reason for the security robustness of this protocol stems from the fact that right after the set-up phase, every request and response message can be conducted strictly in the strongly-encrypted and authenticated protocol format; an adversary therefore has no means of eavesdropping from or injecting malicious contents into the commands or data being exchanged.

Reflecting on the foregoing, a number of techniques have been described for encrypting an input string using one or more transposition vectors and, optionally, other optional processes (e.g., such as bit diffusion, non-linear substitution, bit flipping and other processes). In one embodiment, transposition is used on a segment-wise basis to change position of byte-sized characters and, in another embodiment, transposition is applied on a bit-wise basis, or otherwise. In one embodiment, these techniques can be applied to a format preserving encryption (FPE) process, but this is neither necessary nor desired for all embodiments. For example, a credit card processing (or social security number) exchange example typically will rely on FPE techniques, whereas for password (complex code) generation it may be desired not to preserve format (i.e., as the user can rely on a relatively simply password, which is then deliberately converted into a much more complex password by software). Such a process in one embodiment can be applied to fixed length strings to encrypt those strings, e.g., to process credit card numbers, passwords, social security numbers, general text or other data. In another variation, such an encryption process (and its decryption counterpart) can be applied to data of arbitrary length, to provide robust encryption techniques for text or other data.

Note that opportunities exist for the use of federated identity schemes or standards for credentials presentation that render it difficult to misuse improperly acquired information. For example, requiring the use of specific format auxiliary keys and private keys for encryption of information provide added factors that can be used to thwart an identity thief, in effect, providing an effect of inhibiting an identity thief from making fraudulent usage of a user credential (e.g., a social security number or credit card number) even in online or offline paper transactions. To this effect, a standardized identity scheme can feature a requirement that users enroll in an identity system and subject their identities to preliminary verification schemes that are adapted to verify that the identity has not been compromised. Various other authentication factors, for example, the use of a shared (secret) key corresponding to the identity, and various auxiliary key specifics (e.g., time stamp specification), can then be employed to render a stolen identity un-useable to a thief without the corresponding secret key. In addition, federation or standardization of an encryption methodology as specified herein permits multiple different services to cooperate in defining and sharing a common identity trust domain (e.g., according to a published specification that mandates the use of certain of the principles discussed herein). Such system is advantageous as the user does not need to maintain and remember multiple separate sign-on passwords for each and every cloud account. Services that are cooperating in this fashion (e.g., optionally including one or more cloud services) maintain their autonomy as they can still use and operate different user-ids for their own services and systems.

The techniques taught by this disclosure provide for an arbitrary number space N character transposition. To illustrate several examples of the use of different number spaces, (a) the character set [A-Z, a-z and 0-9_] coupled with the use of 65 character-long strings (i.e., where each character has 63 different possibilities and where the under-bar (_) character is interpreted as a zero for padding purpose) provides for $63^{65}$ possibilities; (b) the character set [A-Z and 0-9_] coupled with the use of 65 character-long strings provides for $37^{65}$ possibilities; and (c) the character set of (94) printable ASCII characters (plus the space character) coupled with the use of 128 character-long strings provides for $95^{128}$ possibilities. The described number space transformation and expansion process can also be used to create a new and novel first network communication protocol adapted to run on any modern transport mechanism, such as by way of example, hyper-text transport protocol or "HTTP," with the protocol executing per message/packet fully integral and independent identity/command/streaming-data authentication. Such a protocol is robust against MITM, replay, or password cracking attacks. An autonomous domain of trust can be established with such first protocol supporting in numbers from a handful of users to multi-millions of users, optionally without the need of relying on any third party certificate authorities. This independence from certificate authorities is particularly advantageous in home intranet applications, where the gateway in the intranet can be the trust server of an autonomous domain, establishing shared secrets during device or user registration for use as device credentials without fear of MITM or DOS attacks. Extranet user registrations can be allowed for guests that have invitation certificate/tokens extended from the primary user or owner of the intranet. Furthermore, such a scheme provides for certain advantages relative to TLS/SSL, as there is no need to maintain session continuity. Additionally, such a scheme natively addresses sign-on authentication whereas TLS/SSL relegates sign-on authentication to a separate process; each packet or message is independently and speedily sign-on authenticated. Such protocol can however still be implemented using standard encryption methods such as SHA2/AES.

What has also been described are techniques which permit the use of very, very long keys (e.g., hundreds to many thousands of bits or bytes), all while preserving an ability to implement basic encryption operations in hardware, using simply shift, add, XOR and other "fast" operations that can be delegated to hardware. When combined with application specific processes (e.g., tokenization for payment processing, password extension to complex values or other operations), such techniques provide powerful tools to provide robust security, without requiring excessive computational complexity. By providing designs rooted primarily in hardware for performing encryption/decryption of input strings, disclosed embodiments permit the use of complex encryption techniques without occupying excessive computing cycles. Implemented in the context of an architecture that uses graphical inputs and outputs (e.g., via a soft-keyboard or other touch screen input, for example, in conjunction with software operating on a computer or mobile device) and where sensitive data is stored in a secure memory or other container (e.g., as part of a graphics processing unit or GPU), sensitive information can be stored in in a manner where it is not accessible by unauthorized software (such as malware or viruses). As a non-limiting example of this, by employing in one embodiment a password manager that does not store user passwords, credit card numbers or other sensitive numbers, or otherwise does not require a user to enter such information into his or her device, and by providing a system that further tokenizes information which is stored or externally communicated outside of a secure container, disclosed techniques provide for additional security against theft or compromise from certain types of attacks. In this manner, such a computing architecture is robust and resistant to all types of malware attacks, including without limitation, key logging, screen scraping, and memory scraping.

Another specifically contemplated embodiment provides for an identity stored on machine-readable media. The identity comprises a TAG, a timestamp and an encrypted data payload. The TAG can be an identifier associated with an identity owner by a service provider. The encrypted data payload can be generated by encrypting the said timestamp string and a certain attributes of the said identity by a set of one or more shared transposition vectors, derived from one or more shared (secret) established between the identity owner and the service provider.

Yet another specifically contemplated embodiment provides for a digital device (e.g., computer) architecture comprising at least one processor, software and associated support hardware including a secure memory and a display, with the device being configured to implement a soft keyboard. The software and/or processor provide for a format preserving encryption (FPE) capability, so as to tokenize information using one or more of the techniques described above.

While a specific set of techniques and applications have been presented as examples, numerous other applications and permutations of these techniques, derived from, or which otherwise employ these principles, will no doubt occur to those skilled in the art. Without limiting the foregoing, each of the use models and variations described in the aforementioned provisional applications, incorporated herein by reference, are expressly contemplated and form a part of this disclosure, in combination with some or any of the techniques discussed herein.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

As indicated, various modifications and changes may be made to the embodiments presented herein without departing from the broader spirit and scope of the disclosure. For example, features or aspects of any of the embodiments may be applied, at least where practical, in combination with any other of the embodiments or in place of counterpart features or aspects thereof. Thus, for example, not all features are shown in each and every drawing and, for example, a feature or technique shown in accordance with the embodiment of one drawing should be assumed to be optionally employable as an element of, or in combination of, features of any other drawing or embodiment, even if not specifically called out in the specification. Accordingly, the specification and drawings are to be regarded in an illustrative rather than a restrictive sense.

We claim:

1. An apparatus to process an operand string to perform at least one of hardware-based encryption or hardware-based decryption, said apparatus comprising instructions stored on non-transitory machine-readable media that when executed are to cause at least one processor to:
generate a transposition vector in dependence on a digital key, the transposition vector having a sequence of values that are to define respective, relative destination positions in a sort order;
populate a nonlinear substitution table with entries at locations which are dependent on the transposition vector, each of the entries comprising a unique set of substitution characters that is uniquely indexed by a respective unique set of N input characters, where N is 2 or more;
store the nonlinear substitution table in a hardware-based memory;
divide the operand string so as to form one or more character subsets each having N characters;
for each given one of the one or more character subsets, use the corresponding N characters to access the nonlinear substitution table to look up and retrieve a corresponding set of substitution characters;
generate a processed string from the retrieved sets of substitution characters; and
store the processed string in non-transitory storage.

2. The apparatus of claim 1 wherein said instructions, when executed, are to cause the at least one processor to derive, from each of the character subsets, a respective set of bits, and to access one of the entries according to the respective values of the bits in order to retrieve substitution characters.

3. The apparatus of claim 1 wherein the digital key is a shared, secret key, and wherein said instructions when executed, are to cause the at least one processor to:
receive the shared, secret digital key from a non-transitory storage device;
receive an auxiliary key;
combine shared, secret digital key and the auxiliary key to obtain second key, the second key having characters;
perform a modulo-based operation on each of the characters of the second key, to obtain associated remainders;
sort the associated remainders according to a predetermined sort ordering scheme; and
obtain the transposition vector as a function of a relationship between a relative position of each of the characters of the second key prior performance of the modulo-based operation and a relative position of the corresponding associated remainder once sorted according to the predetermined sort ordering scheme.

4. The apparatus of claim 3 wherein:
said instructions when executed, are to cause the at least one processor to perform at least one of transmitting or receiving a header, via a wide area network, wherein the header comprises a copy of the auxiliary key;
the at least one of transmitting or receiving comprises transmitting the copy of the auxiliary key via the wide area network if the at least one of hardware-based encryption or hardware-based decryption is hardware-based encryption;
the at least one of transmitting or receiving comprises receiving the copy of the auxiliary key via the wide area network if the at least one of hardware-based encryption or hardware-based decryption is hardware-based decryption, such that said instructions are to cause the at least one processor to generate the transposition vector as a recreation of a transposition vector that was used in a corresponding encryption process using a locally-stored copy of the shared, secret digital key and the received auxiliary key, in order to decrypt the operand string.

5. The apparatus of claim 4 wherein said instructions when executed are to convey the copy of the auxiliary key as part of the header in a clear text format.

6. The apparatus of claim 1 wherein:
the transposition vector is a first transposition vector, the sort order is a first sort order, the nonlinear substitution table is a first nonlinear substitution table, and the processed string is a first processed string;
said instructions, when executed, are to cause the at least one processor to
generate a second transposition vector in dependence on a digital key, the second transposition vector having a second sequence of values that are to define respective, relative destination positions in a second sort order,
populate a second nonlinear substitution table with entries at locations which are dependent on the second transposition vector, each of the entries of the second nonlinear substitution table comprising a unique set of substitution characters that is uniquely indexed by a respective unique set of M input characters, where M is 2 or more, and
store the second nonlinear substitution table in a hardware-based memory; and
said instruction, when executed, are to cause the at least one processor to
divide the first operand string so as to form one or more character subsets each having M characters;
for each given one of the one or more character subsets of the first operand string, use the corresponding M characters to access the nonlinear substitution table to look up and retrieve a corresponding set of second substitution characters,
generate a second processed string from the retrieved sets of second substitution characters, and
store the second processed string in nontransitory storage.

7. The apparatus of claim 6 wherein the digital key used to generate the first transposition vector is also the digital key used to generate the second transposition vector.

8. The apparatus of claim 7 wherein:
possession of the digital key is shared with a remote destination;
said instructions, when executed, are to cause the at least one processor to generate the first transposition vector in further dependence on a first auxiliary key;
said instructions, when executed, are to cause the at least one processor to generate the second transposition vector in further dependence on a second auxiliary key; and
said instructions, when executed, are to cause provision of an encrypted string derived from the second processed string to the remote destination, via a wide area network, and to also cause provision, via the wide area network, of the first auxiliary key and the second auxiliary key to the remote destination.

9. The apparatus of claim 7 wherein:
possession of the digital key is shared with a remote source location;
said instructions, when executed, are to cause the at least one processor to generate the first transposition vector in further dependence on a first auxiliary key;
said instructions, when executed, are to cause the at least one processor to generate the second transposition vector in further dependence on a second auxiliary key; and
said instructions, when executed, are to cause receipt of an encrypted string from the remote source location, via a wide area network, to derive the first operand string from the encrypted string, and to also cause receipt, via the wide area network, of the first auxiliary key and the second auxiliary key from the remote source location.

10. The apparatus of claim 1 wherein:
said instructions, when executed, are to cause the at least one processor to
receive an auxiliary key,
combine the digital key and the auxiliary key to obtain a combined key,
perform a mathematical process on the combined key to generate a second key, and
generate the transposition vector dependent on the second key; and
the mathematical process is characterized by an avalanche effect, such that variation in one bit of the auxiliary key triggers variation in each of most-significant and least-significant portions of the second key.

11. The apparatus of claim 1 wherein said instructions, when executed, are to cause the at least one processor to generate the processed string from the operand string by substituting each retrieved set of substitution characters to replace a corresponding one of the character subsets in the operand string.

12. A method of processing an operand string to perform at least one of hardware-based encryption or hardware-based decryption, the method comprising causing at least one processor to:
generate a transposition vector in dependence on a digital key, the transposition vector having a sequence of values that are to define respective, relative destination positions in a sort order;
populate a nonlinear substitution table with entries at locations which are dependent on the transposition vector, each of the entries comprising a unique set of substitution characters that is uniquely indexed by a respective unique set of N input characters, where N is 2 or more;
store the nonlinear substitution table in a hardware-based memory;
divide the operand string so as to form one or more character subsets each having N characters;
for each given one of the one or more character subsets, use the corresponding N characters to access the nonlinear substitution table to look up and retrieve a corresponding set of substitution characters;
generate a processed string from the retrieved sets of substitution characters; and
store the processed string in non-transitory storage.

13. The method of claim 12 wherein said method further comprises causing the at least one processor to derive, from each of the character subsets, a respective set of bits, and to access one of the entries according to the respective values of the bits in order to retrieve substitution characters.

14. The method of claim 12 wherein the digital key is a shared, secret key, and wherein said method further comprises causing the at least one processor to:
receive the shared, secret digital key from a non-transitory storage device;
receive an auxiliary key;
combine shared, secret digital key and the auxiliary key to obtain second key, the second key having characters;
perform a modulo-based operation on each of the characters of the second key, to obtain associated remainders;
sort the associated remainders according to a predetermined sort ordering; and
obtain the transposition vector as a function of a relationship between a relative position of each of the characters of the second key prior performance of the modulo-based operation and a relative position of the corresponding associated remainder once sorted according to the predetermined sort ordering scheme.

15. The method of claim 14 wherein:
said method further comprises causing the at least one processor to perform at least one of transmitting or receiving a header, via a wide area network, wherein the header comprises a copy of the auxiliary key;
the at least one of transmitting or receiving comprises transmitting the copy of the auxiliary key via the wide area network if the at least one of hardware-based encryption or hardware-based decryption is hardware-based encryption;
the at least one of transmitting or receiving comprises receiving the copy of the auxiliary key via the wide area network if the at least one of hardware-based encryption or hardware-based decryption is hardware-based decryption, such that said instructions are to cause the at least one processor to generate the transposition vector as a recreation of a transposition vector that was used in a corresponding encryption process using a locally-stored copy of the shared, secret digital key and the received auxiliary key, in order to decrypt the operand string.

16. The method of claim 15 further comprising causing the at least one processor to transfer the auxiliary key as part of the header, via a wide area network, in a clear text format.

17. The method of claim 12 wherein:
the transposition vector is a first transposition vector, the sort order is a first sort order, the nonlinear substitution table is a first nonlinear substitution table, and the processed string is a first processed string;
said method further comprises causing the at least one processor to
generate a second transposition vector in dependence on a digital key, the second transposition vector having a second sequence of values that are to define respective, relative destination positions in a second sort order,
populate a second nonlinear substitution table with entries at locations which are dependent on the second transposition vector, each of the entries of the second nonlinear substitution table comprising a unique set of substitution characters that is uniquely indexed by a respective unique set of M input characters, where M is 2 or more, and
store the second nonlinear substitution table in a hardware-based memory; and said method further comprises causing the at least one processor to
- divide the first operand string so as to form one or more character subsets each having M characters;
- for each given one of the one or more character subsets of the first operand string, use the corresponding M characters to access the nonlinear substitution table to look up and retrieve a corresponding set of second substitution characters,
- generate a second processed string from the retrieved sets of second substitution characters, and
- store the second processed string in nontransitory storage.

18. The method of claim 17 wherein the digital key used to generate the first transposition vector is also the digital key used to generate the second transposition vector.

19. The method of claim 18 wherein:
possession of the digital key is shared with a remote destination;
said method further comprises causing the at least one processor to generate the first transposition vector in further dependence on a first auxiliary key;
said method further comprises causing the at least one processor to generate the second transposition vector in further dependence on a second auxiliary key; and
said method further comprises causing provision of an encrypted string derived from the second processed string to the remote destination, via a wide area network, and to also cause provision, via the wide area network, of the first auxiliary key and the second auxiliary key to the remote destination.

20. The method of claim 18 wherein:
possession of the digital key is shared with a remote source location;
said method further comprises causing the at least one processor to generate the first transposition vector in further dependence on a first auxiliary key;
said method further comprises causing the at least one processor to generate the second transposition vector in further dependence on a second auxiliary key; and
said method further comprises causing receipt of an encrypted string from the remote source location, via a wide area network, to derive the first operand string from the encrypted string, and to also cause receipt, via the wide area network, of the first auxiliary key and the second auxiliary key from the remote source location.

21. The method of claim 12 wherein:
said method further comprises causing the at least one processor to
- receive an auxiliary key,
- combine the digital key and the auxiliary key to obtain a combined key,
- perform a mathematical process on the combined key to generate a second key, and
- generate the transposition vector dependent on the second key; and
the mathematical process is characterized by an avalanche effect, such that variation in one bit of the auxiliary key triggers variation in each of most-significant and least-significant portions of the second key.

22. The method of claim 12 wherein said method further comprises causing the at least one processor to generate the processed string from the operand string by substituting each retrieved set of substitution characters to replace a corresponding one of the character subsets in the operand string.

* * * * *